(12) United States Patent
Nagano

(10) Patent No.: US 11,385,388 B2
(45) Date of Patent: Jul. 12, 2022

(54) DISPLAY, ARTICLE, ORIGINAL PLATE, AND METHOD FOR PRODUCING ORIGINAL PLATE

(71) Applicant: TOPPAN PRINTING CO., LTD., Tokyo (JP)

(72) Inventor: Akira Nagano, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 0 days.

(21) Appl. No.: 15/796,158

(22) Filed: Oct. 27, 2017

(65) Prior Publication Data

US 2018/0052262 A1 Feb. 22, 2018

Related U.S. Application Data

(63) Continuation of application No. PCT/JP2016/063344, filed on Apr. 28, 2016.

(30) Foreign Application Priority Data

Apr. 30, 2015 (JP) .............................. JP2015-093427

(51) Int. Cl.
*G02B 5/18* (2006.01)
*B42D 25/328* (2014.01)
(Continued)

(52) U.S. Cl.
CPC .......... *G02B 5/1857* (2013.01); *B42D 25/324* (2014.10); *B42D 25/328* (2014.10);
(Continued)

(58) Field of Classification Search
CPC .. G02B 5/1842; G02B 5/1857; G02B 5/1861; G02B 5/18; G03H 1/0244; B42D 25/324;
(Continued)

(56) References Cited

U.S. PATENT DOCUMENTS 5,058,992 A 10/1991 Takahashi
5,629,070 A * 5/1997 Korth .................... G02B 5/1857
359/2

(Continued)

FOREIGN PATENT DOCUMENTS

CN 102770787 A 11/2012
EP 2 508 922 A1 10/2012
(Continued)

OTHER PUBLICATIONS

International Search Report dated Jun. 7, 2016, in International Patent Application No. PCT/JP2016/063344, 2 pages.
(Continued)

*Primary Examiner* — Audrey Y Chang
(74) *Attorney, Agent, or Firm* — Squire Patton Boggs (US) LLP

(57) ABSTRACT

In display, in a plan view facing an obverse surface of a reflection layer, first reflection surfaces are substantially square in shape, and a second reflection surface occupies gaps between adjacent ones of the first reflection surfaces. The distance between the first reflection surfaces and the second reflection surface in the thickness direction of a substrate has an extent that the obverse surface of the reflection layer emit colored light by interference between light reflected from the first reflection surfaces and light reflected from the second reflection surface. In a plan view facing the obverse surface of the reflection layer, more than one of the first reflection surfaces are located on each of a plurality of imaginary lines. On a straight line intersecting more than one of the imaginary lines, distances between adjacent ones of the imaginary lines have different extents.

10 Claims, 11 Drawing Sheets

(51) Int. Cl.
    *B42D 25/324* (2014.01)
    *B42D 25/425* (2014.01)
    *B42D 25/373* (2014.01)
    *G02F 1/1335* (2006.01)

(52) U.S. Cl.
    CPC ......... *B42D 25/373* (2014.10); *B42D 25/425* (2014.10); *G02B 5/1842* (2013.01); *G02B 5/1861* (2013.01); *G02F 1/133504* (2013.01)

(58) Field of Classification Search
    CPC ... B42D 25/355; B42D 25/328; B42D 25/425
    USPC ...................... 359/2, 572, 567, 569; 430/320
    See application file for complete search history.

(56) References Cited

U.S. PATENT DOCUMENTS

| | | | | |
|---|---|---|---|---|
| 6,541,187 B1* | 4/2003 | Wang | ................... | G03F 7/0015 430/320 |
| 8,982,465 B2* | 3/2015 | Toda | ................... | G02B 5/0278 359/567 |
| 2012/0236415 A1 | 9/2012 | Nagano et al. | | |
| 2014/0104686 A1 | 4/2014 | Yuasa et al. | | |
| 2015/0192897 A1* | 7/2015 | Schilling | .............. | G03H 1/0244 359/2 |
| 2018/0104975 A1 | 4/2018 | Nagano et al. | | |

FOREIGN PATENT DOCUMENTS

| | | |
|---|---|---|
| JP | 4983899 | 7/2012 |
| JP | 2013-193268 | 9/2013 |
| JP | 2014-134739 | 7/2014 |
| WO | WO 2012/176429 | 12/2012 |
| WO | WO 2014/001283 A1 | 1/2014 |

OTHER PUBLICATIONS

Extended European Search Report dated Nov. 29, 2018, in European Patent Application No. 16786558.3, 10 pages.
International Preliminary Report on Patentability dated Oct. 31, 2017, in International Patent Application No. PCT/JP2016/063344, 7 pages.
Chinese Patent Application No. 201680024342.4, received Chinese Office Action dated Nov. 18, 2019, with English Translation of Chinese Office Action, 19 pages.

* cited by examiner

DISPLAY, ARTICLE, ORIGINAL PLATE, AND METHOD FOR PRODUCING ORIGINAL PLATE

BACKGROUND

The present disclosure relates to a display that may be used as a structure for preventing counterfeiting, an article including a display, an original plate for producing a display, and a method for producing an original plate.

Securities, such as banknotes, gift certificates, and checks, cards, such as credit cards, bank cards, and ID cards, and identity documents, such as passports and driver's licenses, have display bodies affixed to prevent counterfeiting of these articles by providing visual effects different from those of printed articles formed by dyes or pigments.

A known display that provides visual effects different from those of printed articles has a plurality of relief diffraction gratings. The relief diffraction gratings differ from one another in the extending direction of grooves or the grating constant, allowing the display to display an iridescent image (see U.S. Pat. No. 5,058,992, for example).

Such display bodies are widely used to prevent counterfeiting of articles, so the techniques used for the display bodies are widely known. Accordingly, the possibility of counterfeiting of the display bodies has been increased, resulting in the need for display bodies that are more effective in preventing counterfeiting than the display bodies that display iridescent images.

In recent years, for the purpose of preventing counterfeiting more effectively, a display has been proposed that provides visual effects that differ from those of display bodies having relief diffraction gratings. The proposed display includes a reflection surface having an relief structure, which is formed by a plurality of first surfaces and a second surface. The display emits light of a mixed color produced by a plurality of wavelengths of light (see Japanese Patent No. 4983899, for example).

When the display of Patent Document 2 is illuminated with light, the display emits light of a specific color toward a wide area in the space above the reflection surface. The display emits the light whose color remains substantially the same regardless of any change in the observation conditions, such as the position of the illumination source relative to the display and the position of the observer relative to the display. The display therefore displays substantially the same image regardless of any change in the observation conditions. However, to enhance the visual effects of display bodies, there has been a demand for display bodies that display images that change as the observation conditions change.

Such a demand applies not only to a display used to prevent counterfeiting but also to a display for decorating an article and a display that is observed for its own quality.

SUMMARY

It is an objective of the present disclosure to provide a display, an article, an original plate for producing a display, and a method for producing an original plate that emit colored light to display an image that changes dynamically.

To achieve the foregoing objective, a display is provided that includes a substrate including a covered surface and a reflection layer covering at least part of the covered surface. The reflection layer has an obverse surface including a plurality of first reflection surfaces and a second reflection surface. In a plan view facing the obverse surface of the reflection layer, the first reflection surfaces are substantially square in shape, and the second reflection surface occupies gaps between adjacent ones of the first reflection surfaces. A distance between the first reflection surfaces and the second reflection surface in a thickness direction of the substrate has an extent that the obverse surface of the reflection layer emit colored light by interference between light reflected from the first reflection surfaces and light reflected from the second reflection surface. In a plan view facing the obverse surface of the reflection layer, more than one of the first reflection surfaces are located on each of a plurality of imaginary lines. On a straight line intersecting more than one of the imaginary lines, distances between adjacent ones of the imaginary lines have different extents.

To achieve the foregoing objective, an article is provided that includes a display and a support portion that supports the display. The display is the above described display.

To achieve the foregoing objective, an original plate for producing a display is provided that includes a covered surface, which includes first covered surfaces and a second covered surface, and a reflection layer, which covers the covered surface. The original plate includes a substrate including a surface and a resist layer that is located on the surface of the substrate and includes a transfer surface, which is opposite to a surface that is in contact with the substrate. The transfer surface includes a plurality of first transfer surfaces for forming the first covered surfaces and a second transfer surface for forming the second covered surface. In a plan view facing the transfer surface, the first transfer surfaces are substantially square in shape, and the second transfer surface occupies gaps between adjacent ones of the first transfer surfaces. A distance between the first transfer surfaces and the second transfer surface in a thickness direction of the substrate is set to an extent that an obverse surface of the reflection layer emit colored light by interference between light reflected from sections of the obverse surface of the reflection layer that are located on the first covered surfaces and light reflected from a section of the obverse surface of the reflection layer that is located on the second covered surface. In a plan view facing the transfer surface, more than one of the first transfer surfaces are located on each of a plurality of imaginary lines. On a straight line intersecting more than one of the imaginary lines, distances between adjacent ones of the imaginary lines have different extents.

To achieve the foregoing objective, a method for producing an original plate is provided. The original plate is used to produce a display including a covered surface, which includes first covered surfaces and a second covered surface, and a reflection layer, which covers the covered surface. The method comprising: forming a resist layer on a surface of a substrate; exposing the resist layer to light; and developing the exposed resist layer to form a transfer surface in the resist layer. The exposing includes exposing the resist layer such that: the transfer surface after developing includes a plurality of first transfer surfaces for forming the first covered surfaces and a second transfer surface for forming the second covered surface, in a plan view facing the transfer surface, the first transfer surfaces are substantially square in shape, and the second transfer surface occupies gaps between adjacent ones of the first transfer surfaces; a distance between the first transfer surfaces and the second transfer surface in a thickness direction of the substrate is set to an extent that an obverse surface of the reflection layer emit colored light by interference between light reflected from sections of the obverse surface of the reflection layer that are located on the first covered surfaces and light reflected from a section of the obverse surface of the reflection layer that is located on the second covered surface; and in a plan view facing the transfer surface, more than one of the first transfer surfaces are located on each of a plurality of imaginary lines, and, on a straight line intersecting more than one of the imaginary lines, distances between adjacent ones of the imaginary lines have different extents.

The above described configurations is able the display to emit light having a color that is determined by the distance between the first reflection surfaces and the second reflection surface. Since a plurality of first reflection surfaces is arranged on each imaginary line, the first reflection surfaces and the second reflection surface located between the first reflection surfaces on each imaginary line may be considered as forming one pseudo surface. Thus, the interference between the reflection light from the first reflection surfaces arranged on the imaginary lines and the reflection light from the second reflection surface located between the imaginary lines produces colored light. The colored light has directivity and is emitted in the direction substantially perpendicular to the extending direction of the imaginary lines in a plan view facing the obverse surface of the reflection layer. As such, the display emits colored light and displays an image that changes dynamically as compared to a structure that emits light isotropically.

DESCRIPTION OF EXEMPLARY EMBODIMENTS

Referring to FIGS. 1 to 17, one embodiment of a display, an article, an original plate, and a method for producing an original plate according to the present disclosure is now described. In the following descriptions, the structure of the display, the operation of the display, the structure of the article, a method for producing the display, and a method for producing an original plate are described in this order.

[Structure of Display]

Referring to FIGS. 1 to 8, the structure of the display is now described. For purpose of illustration, the reflection layer of the display is not shown in FIG. 1.

Figure 1:
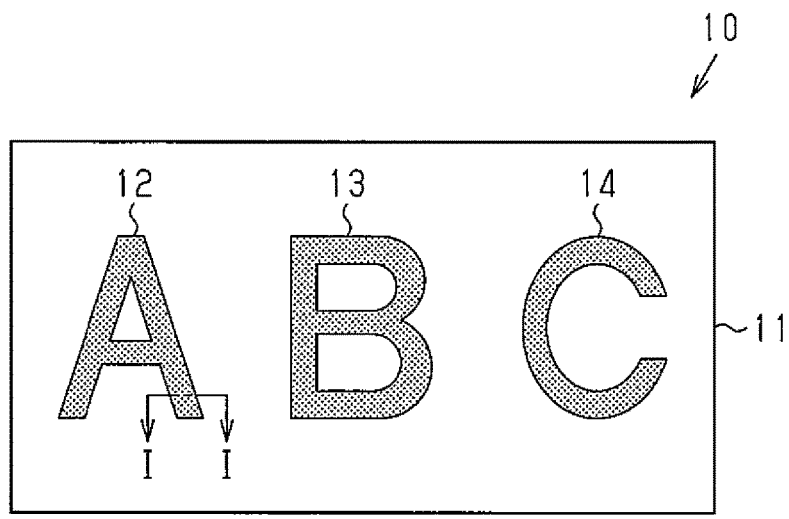
FIG. 1 is a plan view showing the planar structure of a display of one embodiment according to the present disclosure.

As shown in FIG. 1, a display 10 includes a planar substrate 11. A first display region 12, a second display region 13, and a third display region 14 are defined in the display 10. Each display region includes a plurality of display portions. The first display region 12 displays letter A, the second display region 13 displays letter B, and the third display region 14 displays letter C. The display 10 displays character string ABC formed by the first display region 12, the second display region 13, and the third display region 14.

The display 10 may include two or less display regions or four or more display regions. The display regions may display images other than characters, such as numbers, symbols, and pictures.

Figure 2:
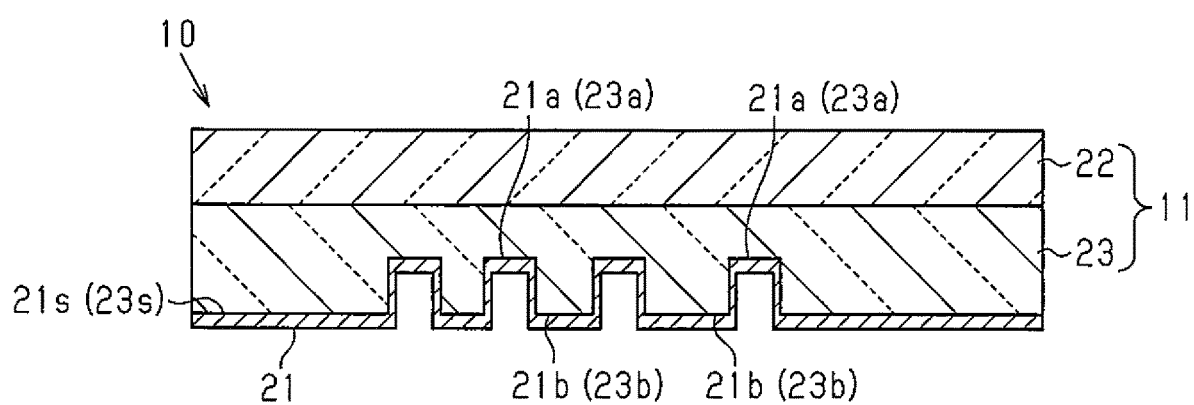
FIG. 2 is a cross-sectional view taken along line I-I in FIG. 1, showing a part of the cross-sectional structure of the display.

FIG. 2 shows the cross-sectional structure taken along line I-I in FIG. 1. As shown in FIG. 2, the display 10 includes a light transmissive substrate 11 and a reflection layer 21. The substrate 11 includes a support layer 22 and an relief layer 23. The relief layer 23 has a covered surface 23s, which is an relief surface and opposite to the support layer 22. Although the substrate 11 of the present embodiment includes the support layer 22 and the relief layer 23, the substrate 11 may include only one layer having the covered surface 23s.

The covered surface 23s includes a plurality of first covered surfaces 23a and a second covered surface 23b. The first covered surfaces 23a differ from the second covered surface 23b in position in the thickness direction of the substrate 11.

Although the reflection layer 21 covers the entire covered surface 23s, it is sufficient that the reflection layer 21 cover the first covered surfaces 23a and the second covered surface 23b, which form at least part of the covered surface 23s. The surface of the reflection layer 21 that is in contact with the covered surface 23s of the relief layer 23 is a reflection surface 21s, which is an example of the obverse surface of the reflection layer 21. In the present embodiment, light enter from the side on the support layer 22 of the display 10. Thus, surface of the reflection layer 21 that is in contact with the covered surface 23s of the substrate 11 is the reflection surface 21s, which reflects the light incident on the display 10.

The reflection layer 21 increases reflection efficiency of incident light on the display 10, thus emit light intensity of the display 10 is higher than a display that does not employ a reflection layer. The reflection layer 21 increases visibility of the display 10 accordingly.

Light may be incident on the reflection layer 21 from opposite side to the substrate 11 with respect to the reflection layer 21. In this case, surface of the reflection layer 21 that is opposite to surface in contact with the covered surface 23s serves as reflection surface.

The reflection surface 21s includes a plurality of first reflection surfaces 21a and a second reflection surface 21b. In the thickness direction of the substrate 11, the first reflection surfaces 21a differ from the second reflection surface 21b in position, but each first reflection surface 21a is identical to the other first reflection surfaces 21a in position. The first and second reflection surfaces 21a and 21b are flat surfaces, and the first reflection surfaces 21a are substantially parallel to the second reflection surface 21b.

That is, the sections of the reflection surface 21s that are in contact with the first covered surfaces 23a of the relief layer 23 are the first reflection surfaces 21a, and the section that is in contact with the second covered surface 23b of the relief layer 23 is the second reflection surface 21b.

The thickness of the reflection layer 21 in the thickness direction of the substrate 11 is between 30 nm and 150 nm inclusive, for example. In the reflection layer 21, the sections corresponding to the first reflection surfaces 21a and the section corresponding to the second reflection surface 21b have the same thickness.

Figure 3:
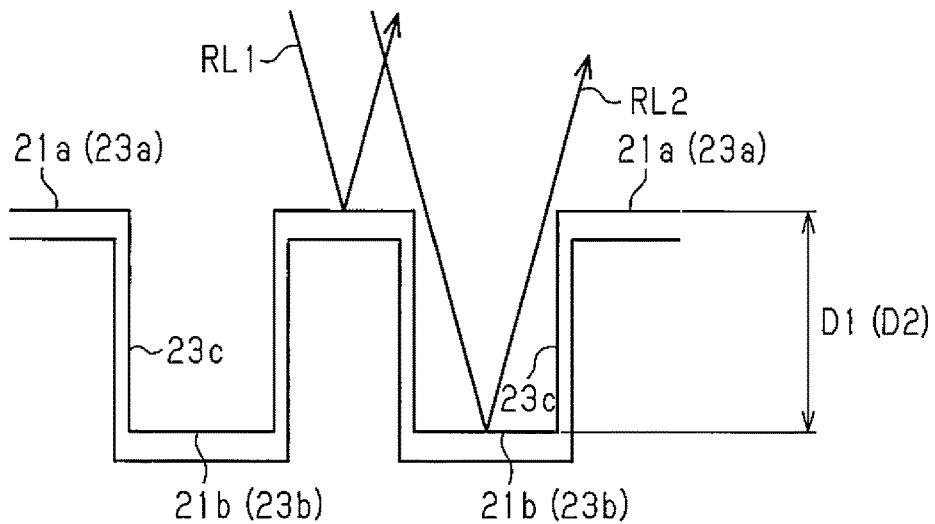
FIG. 3 is an enlarged cross-sectional view showing a part of the cross-sectional structure of the display.

Referring to FIG. 3, the distance between the first reflection surfaces 21a and the second reflection surface 21b in the thickness direction of the substrate 11 is referred to as an inter-reflection-surface distance D1. The inter-reflection-surface distance D1 has an extent that the reflection surface 21s emit colored light by the interference between first reflection light RL1 reflected from the first reflection surfaces 21a and second reflection light RL2 reflected from the second reflection surface 21b.

When white light enter on the reflection surface 21s, the first reflection light RL1 reflected from the first reflection surfaces 21a differs from the second reflection light RL2 reflected from the second reflection surface 21b in optical path length, which is the value obtained by multiplying geometric distance by refractive index. The interference of light according to the difference in optical path lengths reduces the diffraction efficiency of the diffracted light of a certain wavelength at the reflection surface 21s, whereas the diffraction efficiency of the light of the other wavelengths is not reduced. The reflection surface 21s thus emits light of a predetermined color, that is, a specific color determined by the inter-reflection-surface distance D1.

The distance between the first covered surfaces 23a, which are in contact with the first reflection surfaces 21a, and the second covered surface 23b, which is in contact with the second reflection surface 21b, is referred to as an inter-covered-surface distance D2. The inter-covered-surface distance D2 is preferably between 0.05 µm and 0.5 µm inclusive, more preferably between 0.15 µm and 0.4 µm inclusive, for example.

The inter-covered-surface distance D2 that is greater than or equal to 0.05 µm reduces intensity of light in the visible wavelength range, allowing the reflection surface 21s to emit light of a color having a higher chroma than white. When the inter-covered-surface distance D2 is greater than or equal to 0.05 µm, external factors in manufacturing of the display 10, such as the condition of manufacturing apparatus, a change in manufacturing environment of the display 10, and a change in the composition of the material of the display 10, are less likely to affect optical properties of the display 10. Further, the inter-covered-surface distance D2 that is less than or equal to 0.5 µm allows the covered surface 23s to be formed with a higher accuracy in shape and size than a structure having a greater inter-covered-surface distance D2.

In the structure in which light enter on the reflection layer 21 from opposite side to the substrate 11 with respect to the reflection layer 21, the surface of the reflection layer 21 that is opposite to the surface in contact with the relief layer 23 serves as the reflection layer. Thus, premising that the sections of the reflection layer 21 corresponding to the first reflection surfaces 21a and the section corresponding to the second reflection surface are equal in thickness, the inter-covered-surface distance D2 that is within the range described above results in the inter-reflection-surface distance D1 having an extent that reflection surface emit light of the specific color.

The sections of the reflection layer 21 corresponding to the first reflection surfaces 21a may differ from the section corresponding to the second reflection surface 21b in thickness, as long as the inter-reflection-surface distance D1, which is the distance between the first reflection surfaces 21a and the second reflection surface 21b, is within the range described above for the inter-covered-surface distance D2.

The side surfaces 23c connecting the first covered surfaces 23a to the second covered surface 23b are substantially perpendicular to the second covered surface 23b. However, the side surfaces 23c may be inclined with respect to the direction normal to the second covered surface 23b. Nevertheless, the angle formed by the side surfaces 23c and the second covered surface 23b is preferably closer to a right angle. The angle between the side surfaces 23c and the second covered surface 23b that is closer to right angle increases chroma of the color of light emitted by the reflection surface 21s.

The sections of the reflection layer 21 covering the side surfaces 23c have a thickness in the direction perpendicular to the thickness direction of the substrate 11. The thickness is less than the thickness of the sections of the reflection layer 21 corresponding to the first reflection surfaces 21a and the second reflection surface 21b in the thickness direction of the substrate 11.

Figure 4:
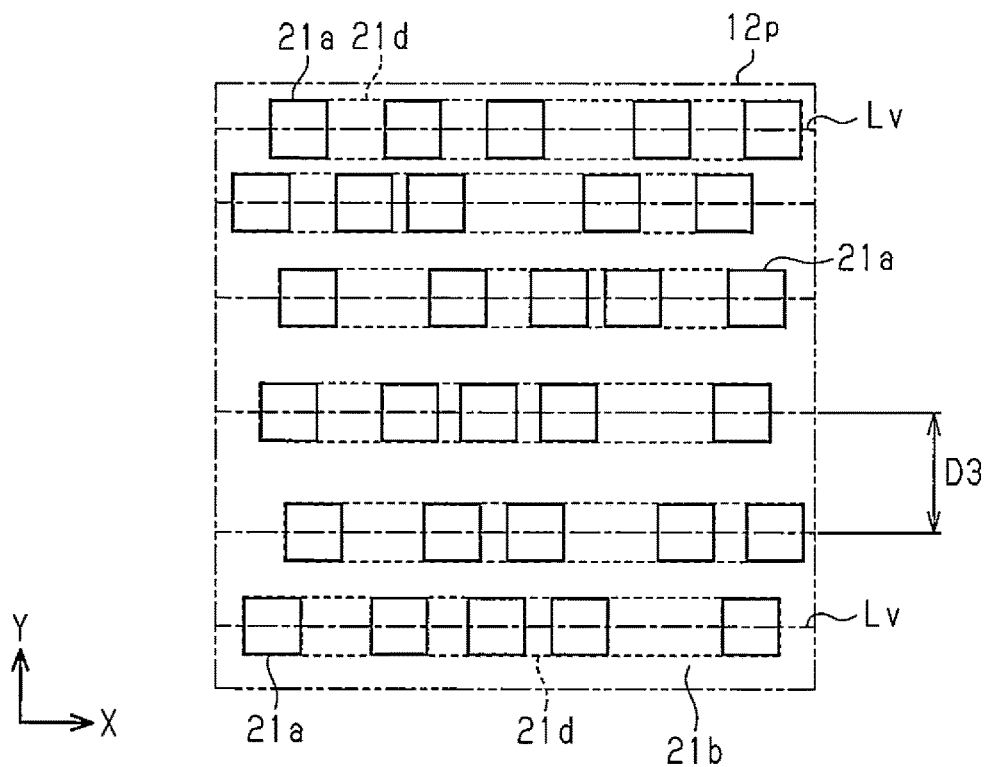
FIG. 4 is a plan view showing the planar structure of a display portion as viewed facing the reflection surface.

FIG. 4 is an enlarged view showing one of display portions forming the first display region 12. The display portion is a part of the first display region 12. FIG. 4 shows the planar structure as viewed facing the reflection surface 21s.

The display portion shown in FIG. 4 is square in shape, but the display portion may have other shape, such as the shape of a rectangle, a triangle, a circle, or an ellipse. When the display portion has a polygonal shape, the length of one side of outer edge of the display portion is preferably less than or equal to 300 µm. Each display portion serves as one pixel with which the first display region 12 displays one image.

As shown in FIG. 4, in a plan view facing the reflection surface 21s, the first reflection surfaces 21a in one display portion 12p of the first display region 12 are substantially square in shape, and the second reflection surface 21b occupies gaps between adjacent ones of the first reflection surfaces 21a.

In a plan view facing the reflection surface 21s, a plurality of first reflection surfaces 21a is located on each imaginary line Lv. That is, a plurality of first reflection surfaces 21a is arranged on each imaginary line Lv. The imaginary lines Lv extend in X direction, which is one direction, and the imaginary lines Lv are arranged in Y direction, which is perpendicular to the X direction. The imaginary lines Lv are arranged in the Y direction so as to reduce emission of diffracted light that is perceivable by the naked eye.

Distance between two imaginary lines Lv, which are adjacent to each other in the Y direction, is referred to as an inter-imaginary-line distance D3. The inter-imaginary-line distance D3 varies irregularly with respect to the order of arrangement of the imaginary lines Lv. In other words, the imaginary lines Lv are arranged in the Y direction in a random manner, and each imaginary line Lv is parallel to the other imaginary lines Lv. That is, in a plan view facing the reflection surface 21s, the inter-imaginary-line distances D3 have different extents and vary irregularly with respect to the order of arrangement of the imaginary lines Lv on a straight line intersecting imaginary lines Lv, for example a straight line extending in the Y direction.

The inter-imaginary-line distances D3 of the imaginary lines Lv are preferably between 0.3 µm and 2 µm inclusive, for example. A smaller inter-imaginary-line distance D3 increases the range of angles at which light beams are emitted in the direction perpendicular to the extending direction of the imaginary lines Lv. This enlarges region from which the observer of the display 10 can see emitted light. In contrast, a larger inter-imaginary-line distance D3 reduces the range of angles at which light beams are emitted in the direction perpendicular to extending direction of the imaginary lines Lv. This reduces size of the region from which the observer of the display 10 can see the emitted light.

On each imaginary line Lv, a plurality of first reflection surfaces 21a is arranged in a random manner. Thus, for the first reflection surfaces 21a arranged along one imaginary line Lv, the distances between adjacent ones of the first reflection surfaces 21a are not uniform values and vary irregularly with respect to the order of arrangement of the first reflection surfaces 21a. The structure in which a plurality of first reflection surfaces 21a is arranged in a random manner on each imaginary line Lv is advantageous in that the structure limits emission of diffracted light in the extending direction of the imaginary lines Lv, which would otherwise occur according to the periodicity of the first reflection surfaces 21a.

In the present embodiment, each imaginary line Lv differs from the other imaginary lines Lv in positions of the first reflection surfaces 21a on the imaginary line Lv. However, as long as first reflection surfaces 21a are arranged in a random manner on each imaginary line Lv, each imaginary line Lv may be identical to the other imaginary lines Lv in the positions of the first reflection surfaces 21a on the imaginary line Lv.

In addition, first reflection surfaces 21a may be arranged regularly on each imaginary line Lv. That is, first reflection surfaces 21a may be arranged with a fixed periodicity. Such a structure still allows the display portion 12p to emit colored light by the interference between the light reflected from the first reflection surfaces 21a and the light reflected from the second reflection surface 21b.

Since a plurality of first reflection surfaces 21a is arranged on each imaginary line Lv, the plurality of first reflection surfaces 21a arranged along one imaginary line Lv functions like a structure formed by hairline finish on a surface of a metal layer, for example. Thus, the display portion 12p emits light in the direction perpendicular to the extending direction of the imaginary lines Lv but hardly emits colored light in the extending direction of the imaginary lines Lv.

The first reflection surfaces 21a that are arranged along one imaginary line Lv and the second reflection surface 21b that occupies the gaps between adjacent ones of the first reflection surfaces 21a on that imaginary line Lv function as a pseudo surface 21d extending along the imaginary line Lv. Consequently, the colored light that is produced by the pseudo surfaces 21d and the second reflection surface 21b located between adjacent pseudo surfaces 21d is emitted in direction perpendicular to the imaginary lines Lv.

In other words, among the directions in which light is emitted from the display portion 12p, the direction that is perpendicular to the direction in which the intensity of the emitting light is maximized is the extending direction of the imaginary lines Lv in the display portion 12p. Therefore, the extending direction of the imaginary lines Lv in the display portion 12p can be identified by the direction in which light is emitted from the display portion 12p.

Figure 5:
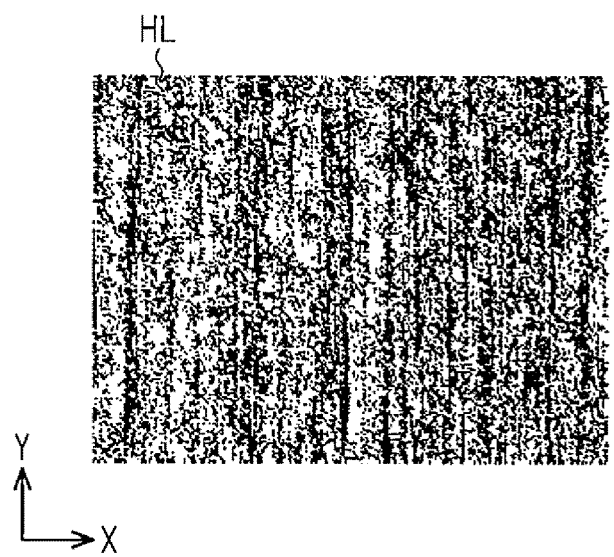
FIG. 5 is a plan view showing an example of structures formed by hairline finish.

FIG. 5 shows structures HL that are formed in a surface of a metal layer by typical hairline finish. As shown in FIG. 5, the metal layer after hairline finish includes a plurality of linear structures extending in the Y direction. The structures are arranged at irregular intervals in a direction that intersects the Y direction. The heights of the structures have different extents. Thus, the structures formed by hairline finish do not function to reduce the diffraction efficiency of light of a specific wavelength. When white light enter on the metal layer having hairline finish, the metal layer emits white scattered light in the X direction, which is perpendicular to the Y direction.

As viewed facing the reflection surface 21s, the length of one side of each first reflection surface 21a is preferably between 0.3 µm and 2 µm inclusive. When the first reflection surfaces 21a having such dimensions are arranged in the display portion 12p, the distances between adjacent first reflection surfaces 21a may be between 0.3 µm and 2 µm inclusive, for example.

When the length of one side of the first reflection surface 21a and the distances between first reflection surfaces 21a are between 0.3 µm and 2 µm inclusive, the emission angle of the diffracted light is greater than that in a structure in which length of one side of the first reflection surface 21a and the distances between first reflection surfaces 21a are greater. This enlarges the region in which the colored light that consists of a plurality of light can be observed.

In a plan view facing the reflection surface 21s, the length of one side of each first reflection surface 21a of the display portion 12p is preferably about same as the length of one side of the other first reflection surfaces 21a. That is, the first reflection surfaces 21a are substantially square in shape and preferably have substantially same area.

When length of one side of each first reflection surface 21a is between 0.3 μm and 2 μm inclusive as described above, the first reflection surfaces 21a are extremely minute structures. Such a first reflection surface 21a is difficult to form as compared to a first reflection surface 21a having a longer side. To form each first reflection surface 21a with high accuracy, the first reflection surfaces 21a are preferably substantially identical to one another in shape and area.

The first reflection surfaces 21a that are substantially identical in shape and area reduce process defects, such as variance in flatness of the first reflection surfaces 21a or variance in the inter-reflection-surface distance D1 of the first reflection surfaces 21a, as compared to a structure in which the first reflection surfaces 21a have different shapes. Thus, the color of light emitted from the display portion 12p is less likely to be changed from designed color to an unintentional color, which would otherwise occur if the display portion 12p has process defects.

In a plan view facing the reflection surface 21s of the display portion 12p, the sum of area of the second reflection surface 21b and the areas of all first reflection surfaces 21a is an area S of the display portion 12p, and the sum of areas of all first reflection surfaces 21a is the area S1. Proportion of the area S1 to the area S (S1/S) in percentage is the occupancy ratio of the first reflection surfaces 21a in the display portion 12p.

In a plan view facing the reflection surface 21s, the occupancy ratio of the first reflection surfaces 21a are preferably substantially equal to one another the display portions 12p. In other words, it is preferable that each display portion 12p be substantially equal to the other display portions 12p in the area occupied by all the first reflection surfaces 21a in the display portion 12p. In each display portion 12p, the occupancy ratio of the first reflection surfaces 21a determines the intensity of colored light emitted from the display portion 12p.

Thus, when each display portion 12p is substantially equal to the other display portions 12p in the occupancy ratio of the first reflection surfaces 21a, the difference among the display portions 12p in the intensity of light emitted from each display portions 12p is reduced. This limits relief distribution of the intensity of light emitted from the first display region 12, increasing the quality of the image displayed by the display 10.

In each display portion 12p, the occupancy ratio of the first reflection surfaces 21a is preferably between 15% and 50% inclusive, for example. That is, in the display portion 12p, the area occupied by all first reflection surfaces 21a is preferably between 15% and 50% inclusive of the total area of the display portion 12p.

The first reflection surfaces 21a in each display portion 12p are substantially square in shape, and each first reflection surface 21a is arranged separate from the other first reflection surfaces 21a. Therefore, the occupancy ratio is 50% at maximum. A higher occupancy ratio in a display portion 12p increases the intensity of light emitted from the display portion 12p and is therefore preferred to brighten the image displayed by the first display region 12. When the occupancy ratio is greater than or equal to 15%, intensity of light emitted from the display portion 12p will be high enough for the observer to perceive the image displayed by the first display region 12.

That is, in order for the display portion 12p to emit light having a color determined by the inter-reflection-surface distance D1 and to emit such light in a sufficient intensity, the occupancy ratio of the first reflection surfaces 21a is preferably between 15% and 50% inclusive.

As viewed facing the first reflection surfaces 21a, the sides defining each first reflection surface 21a include the sides extending in X direction and the sides extending in Y direction. However, the sides defining each first reflection surface 21a may include the sides inclined with respect to the X direction and the sides inclined with respect to the Y direction. A plurality of first reflection surfaces 21a arranged on one imaginary line Lv may include a first reflection surface 21a that is defined by the sides extending in the X direction and the sides extending in the Y direction, and a first reflection surface 21a that is defined by the sides inclined with respect to the X direction and the sides inclined with respect to the Y direction.

Figure 6:
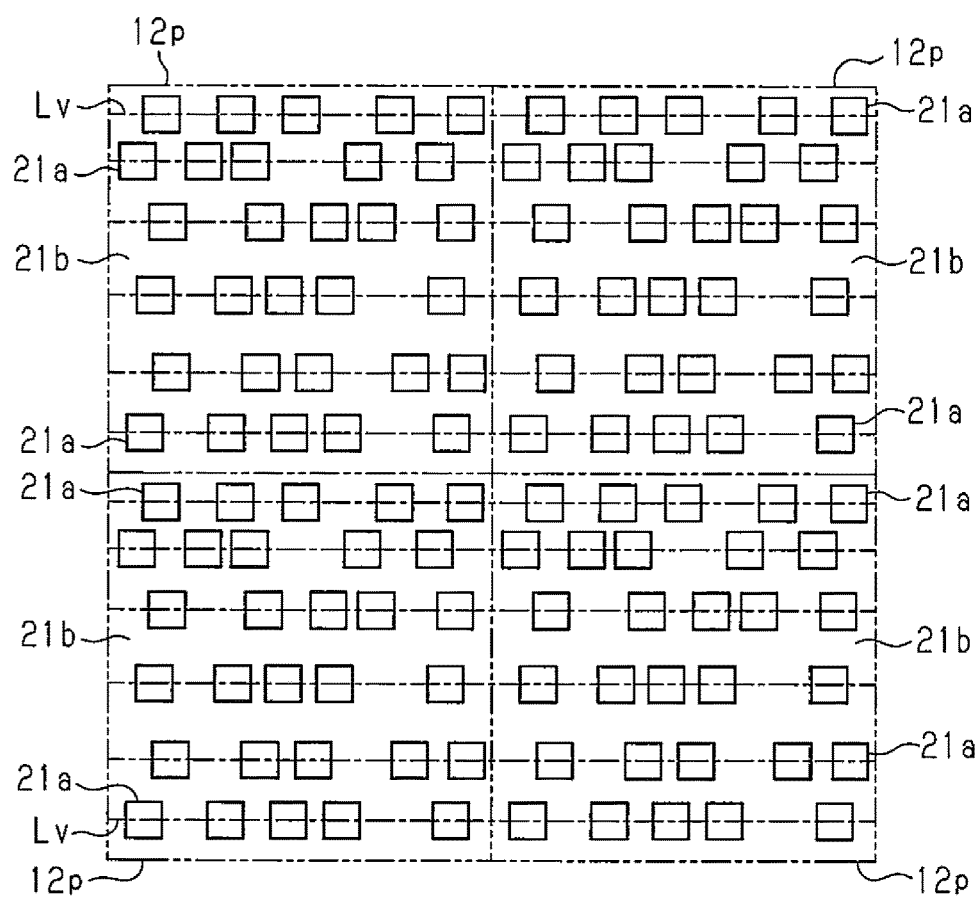
FIG. 6 is a plan view showing the planar structures of display portions as viewed facing the reflection surface.

As shown in FIG. 6, in each display portion 12p forming the first display region 12, all first reflection surfaces 21a are separated from outer edge of the display portion 12p. At the boundaries between the display portions 12p, there are gaps between the first reflection surfaces 21a of one display portion 12p and the first reflection surfaces 21a of another display portion 12p. One display portion 12p is an example of the first display portion, and another display portion 12p is an example of second display portion.

As long as there are gaps between the first reflection surfaces 21a of one display portion 12p and the first reflection surfaces 21a of another display portion 12p at the boundary between the display portions 12p, each display portion 12p may include a first reflection surface 21a that is in contact with the outer edge of the display portion 12p.

Figure 7:
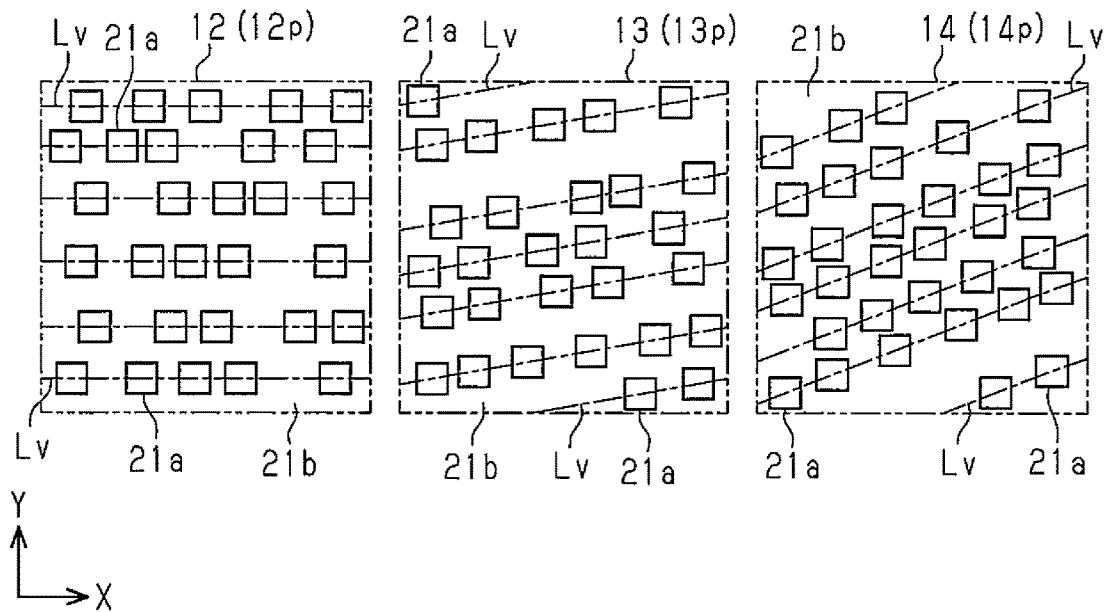
FIG. 7 is a plan view showing the planar structures of a display portion of the first display region, a display portion of the second display region, and a display portion of the third display region, which are arranged side by side.

FIG. 7 shows one display portion of each of the first display region 12, the second display region 13, and the third display region 14. These portions are parts of the display regions. In FIG. 7, for purpose of illustration, the display portions of the display regions are arranged in one direction. FIG. 7 shows planar structures as viewed facing the reflection surface 21s.

As shown in FIG. 7, in a plan view facing the reflection surface 21s, the display portion 13p of the second display region 13 includes a plurality of imaginary lines Lv in a similar manner as the display portion 12p of the first display region 12. In the display portion 13p, the imaginary lines Lv extend in second extending direction which intersects the X direction, and the direction of orientation which is the extending direction of the imaginary lines Lv differs from that in the display portion 12p of the first display region 12. The imaginary lines Lv are arranged in the direction perpendicular to the second extending direction in a random manner.

On each imaginary line Lv, a plurality of first reflection surfaces 21a is arranged in a random manner. However, the first reflection surfaces 21a may be arranged on the imaginary line Lv with a fixed periodicity.

In a plan view facing the reflection surface 21s, the display portion 14p of the third display region 14 includes a plurality of imaginary lines Lv in a similar manner as the display portion 12p of the first display region 12. The imaginary lines Lv extend in third extending direction, which intersects the X direction, and the angle formed by the X direction and the third extending direction is greater than the angle formed by the X direction and the second extending direction. In the display portion 14p, the direction of orientation, which is the extending direction of the imaginary lines Lv, differs from both of the direction of orientation in the first display region 12 and the direction of orientation in the second display region 13. The angle formed by the X direction and the third extending direction may be smaller than the angle formed by the X direction and the second extending direction. The imaginary lines Lv are arranged in the direction perpendicular to the third extending direction in a random manner.

On each imaginary line Lv, a plurality of first reflection surfaces 21a is arranged in a random manner. However, the first reflection surfaces 21a may be arranged on the imaginary line Lv with a fixed periodicity.

The first display region 12, the second display region 13, and the third display region 14 differ from one another in the extending direction of the imaginary lines Lv. Accordingly, directivity of emitted light of the first display region 12, the second display region 13, and the third display region 14 differ from one another.

The first display region 12, the second display region 13, and the third display region 14 differ from one another in the extending direction of the imaginary lines Lv. However, at least two of the three display regions may be identical in the extending direction of the imaginary lines Lv.

The inter-reflection-surface distance D1 of the first display region 12, the inter-reflection-surface distance D1 of the second display region 13, and the inter-reflection-surface distance D1 of the third display region 14 are equal. Accordingly, the first display region 12, the second display region 13, and the third display region 14 emit light of same color.

Figure 8:
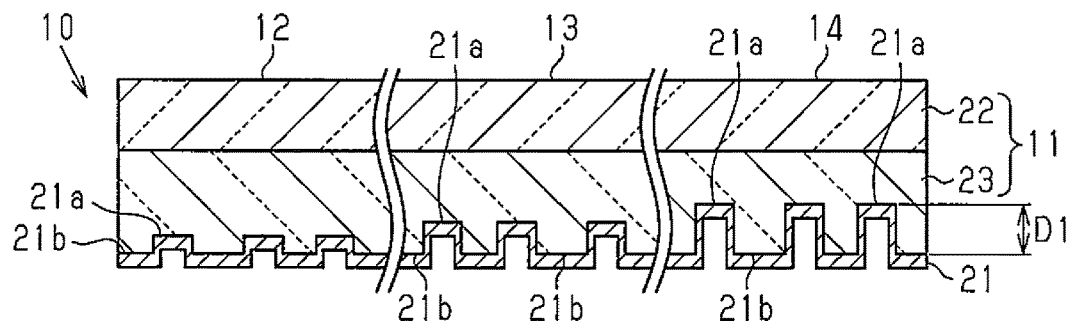
FIG. 8 is a cross-sectional view showing the cross-sectional structures of a display portion of the first display region, a display portion of the second display region, and a display portion of the third display region, which are arranged side by side.

Alternatively, as shown in FIG. 8, the first display region 12, the second display region 13, and the third display region 14 may differ from one another in the inter-reflection-surface distance D1. For example, the inter-reflection-surface distance D1 of the first display region 12 is smallest, the inter-reflection-surface distance D1 of the second display region 13 is second smallest, and the inter-reflection-surface distance D1 of the third display region 14 is largest.

Since the first display region 12, the second display region 13, and the third display region 14 differ from one another in the inter-reflection-surface distance D1, the first display region 12, the second display region 13, and the third display region 14 emit light of mutually different colors.

Further, in each of the first display region 12, the second display region 13, and the third display region 14, each display portion may differ from the other display portions in the inter-reflection-surface distance D1. By this, each the first display region 12, the second display region 13, and the third display region 14 display a mixed color of multiple colors.

[Operation of Display] Referring to FIGS. 9 to 13, the operation of the display 10 is now described. Before the description of the operation of the display 10, the relationship among the grating constant of the diffraction grating, which is the pitch of the grooves in the diffraction grating, the wavelengths of illumination light, the incident angle of illumination light, and the emission angle of diffracted light is described.

[Diffraction Grating]

When the diffraction grating is illuminated with illumination light from a light source, the diffraction grating emits strong diffracted light in a specific direction according to the traveling direction and the wavelength of the illumination light, which is the incident light.

The emission angle $\beta$ of the mth-order diffracted light (m=0, ±1, ±2, . . . ) is calculated from Equation (1) below when the light travels in a plane that is perpendicular to the extending direction of the grooves of the diffraction grating.

[Math. 1]

$$d = \frac{m\lambda}{\sin\alpha - \sin\beta} \quad (1)$$

In Equation (1), d is the grating constant of the diffraction grating, m is the diffraction order, and $\lambda$ is the wavelength of the incident light and the diffracted light. Further, $\alpha$ is the emission angle of the zeroth-order diffracted light, which is the regular reflection light. The absolute value of $\alpha$ is equal to the incident angle of the illumination light. When the diffraction grating is a reflective diffraction grating, the incident direction of the illumination light and the emission direction of the regular reflection light are symmetrical with respect to the direction normal to the surface including the diffraction grating.

When the diffraction grating is a reflective diffraction grating, the angle $\alpha$ is greater than or equal to 0° and less than 90° inclusive. Further, when illumination light is inclined with respect to the surface including the diffraction grating and two angular ranges bounded by angle of the direction normal to the surface, which is 0°, are set, angle $\beta$ is a positive value if the emission direction of the diffracted light and the emission direction of the regular reflection light are within the same angular range, and the angle $\beta$ is a negative value if the emission direction of the diffracted light and the incident direction of the illumination light are within same angular range.

Figure 9:
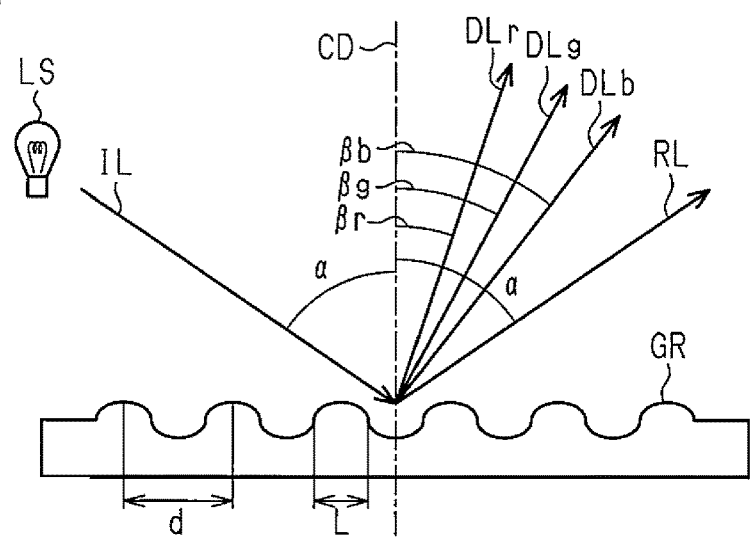
FIG. 9 is a schematic view of the state in which a diffraction grating having a relatively small grating constant emits positive first-order diffracted light.
Figure 10:
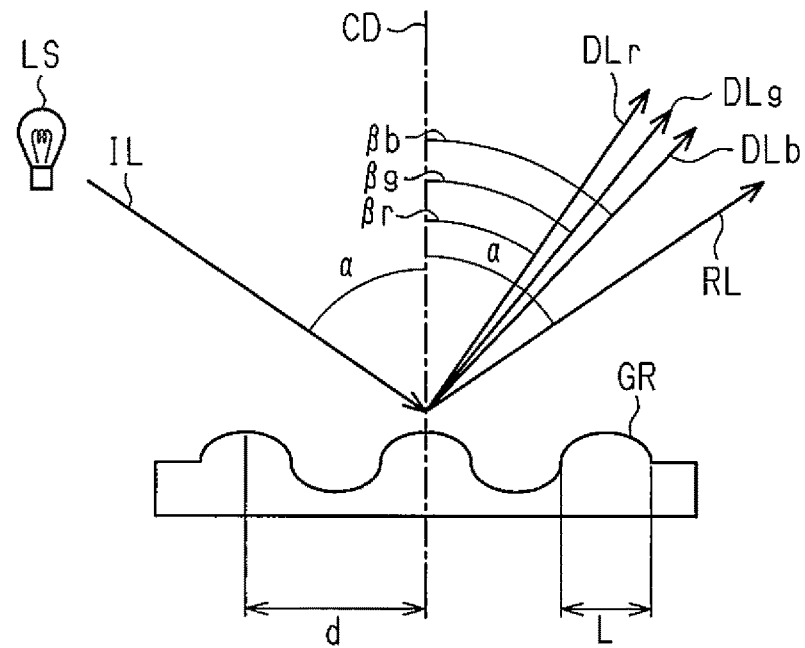
FIG. 10 is a schematic view of the state in which a diffraction grating having a relatively large grating constant emits positive first-order diffracted light.

FIG. 9 schematically shows state in which a diffraction grating having a relatively small grating constant emits first-order diffracted light. FIG. 10 schematically shows the state in which a diffraction grating having a relatively large grating constant emits first-order diffracted light.

As shown in FIGS. 9 and 10, a point light source LS emits white illumination light IL. The illumination light IL contains a red light component, which has wavelengths in the red wavelength region, a green light component, which has wavelengths in the green wavelength region, and a blue light component, which has wavelengths in the blue wavelength region. The green light component, the blue light component, and the red light component emitted by the point light source LS are incident on a diffraction grating GR at an incident angle $\alpha$ with respect to the normal direction CD. The diffraction grating GR emits part of the green light component as diffracted light DLg at an emission angle $\beta g$, emits part of the blue light component as diffracted light DLb at an emission angle $\beta b$, and emits part of the red light component as diffracted light DLr at an emission angle $\beta r$.

As clearly shown by the comparison between the emission angles $\beta$ shown in FIG. 9 and the emission angles $\beta$ shown in FIG. 10, the diffraction grating GR having a greater grating constant d emits diffracted light beams in directions closer to the direction in which the regular reflection light RL is emitted. In addition, the greater the grating constant d of the diffraction grating GR, the smaller the differences among the emission angle $\beta g$, the emission angle $\beta b$, and the emission angle $\beta r$.

For purpose of illustration, of the diffracted light beams emitted by the diffraction grating GR, the diffracted light of other orders that are obtained by Equation (1) are not shown in FIGS. 9 and 10.

Under specific illumination conditions, the diffraction grating GR emits diffracted light beams at different emission angles depending on wavelengths of diffracted light. When light source is a white light source, such as sun or a fluorescent lamp, the diffraction grating GR emits light beams of different wavelengths at different emission angles. Thus, the image displayed by the diffraction grating GR is iridescent and changes its color in response to change in observation angle of the observer of the diffraction grating GR, which is the viewing direction of the observer relative to the surface including the diffraction grating GR.

With reference to Equation (2), the relationship among grating constant of diffraction grating, wavelength of the illumination light, and intensity of diffracted light in an emission direction of diffracted light, i.e., diffraction efficiency, is now described.

According to Equation (1), when illumination light enter at an incident angle α on a diffraction grating GR of a grating constant d, diffraction grating emits diffracted light at an emission angle β. Diffraction efficiency of light of a wavelength λ varies depending on factors such as grating constant of diffraction grating and the depth of grooves. The diffraction efficiency may be obtained by Equation (2) below.

[Math. 2]

$$\eta = \left(\frac{2}{\pi}\right)^2 \times \sin^2\left(\frac{2\pi}{\lambda} \times \frac{r}{\cos\theta}\right) \times \sin^2\left(\frac{\pi}{d} \times L\right) \quad (2)$$

In Equation (2), η is diffraction efficiency (η is a value between 0 and 1 inclusive), r is depth of grooves in diffraction grating, L is width of the grooves in diffraction grating, d is grating constant, θ is incident angle of illumination light, and λ is wavelength of illumination light and diffracted light. Equation (2) holds true for diffraction grating that has shape of a rectangular wave in a cross-section taken in a plane perpendicular to longitudinal direction of grooves and in which grooves have a relatively small depth.

As is evident from Equation (2), the diffraction efficiency η varies depending on depth r of grooves, grating constant d, incident angle θ, and wavelength λ. In addition, the diffraction efficiency η tends to decrease gradually as diffraction order m increases.

[Display]

Figure 11:
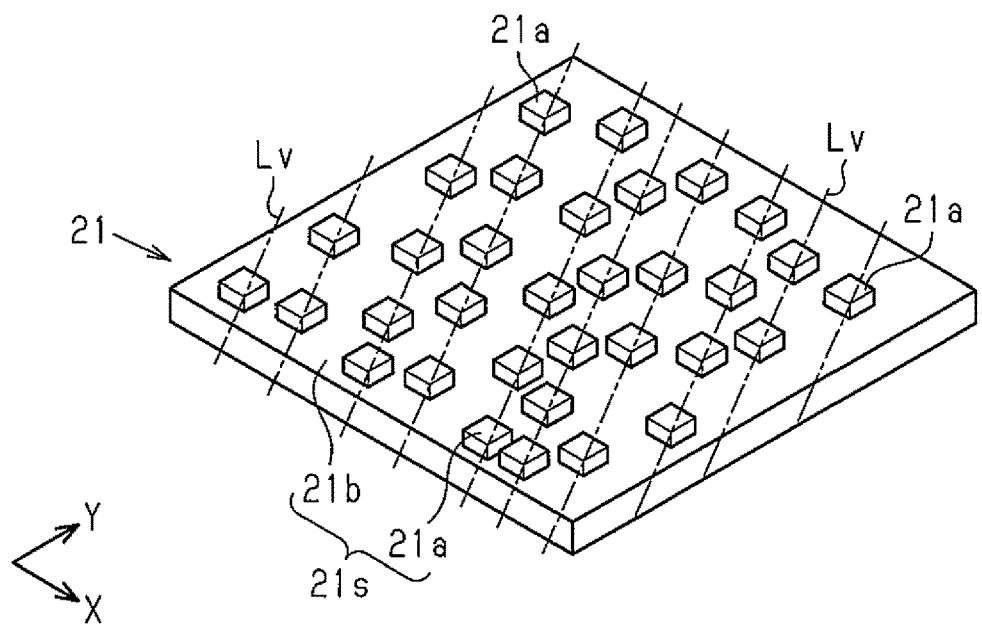
FIG. 11 is a perspective view showing the structure of an example of a display portion.
Figure 12:
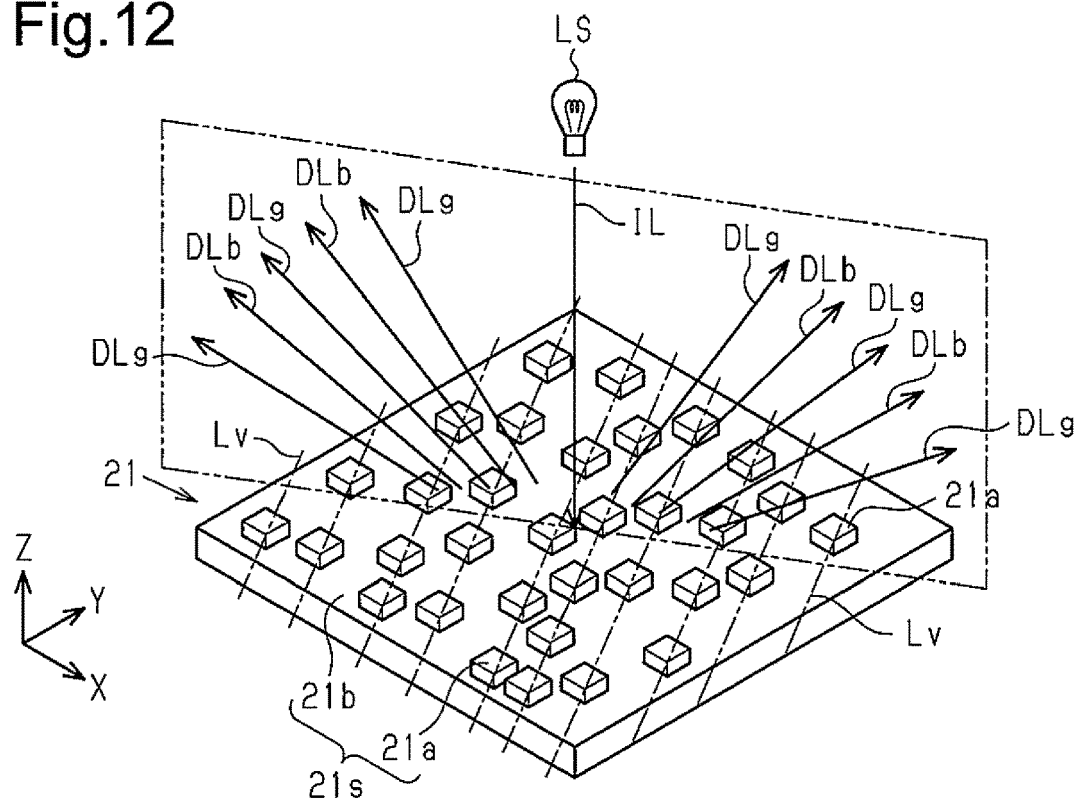
FIG. 12 is a diagram for illustrating the operation of the display portion.
Figure 13:
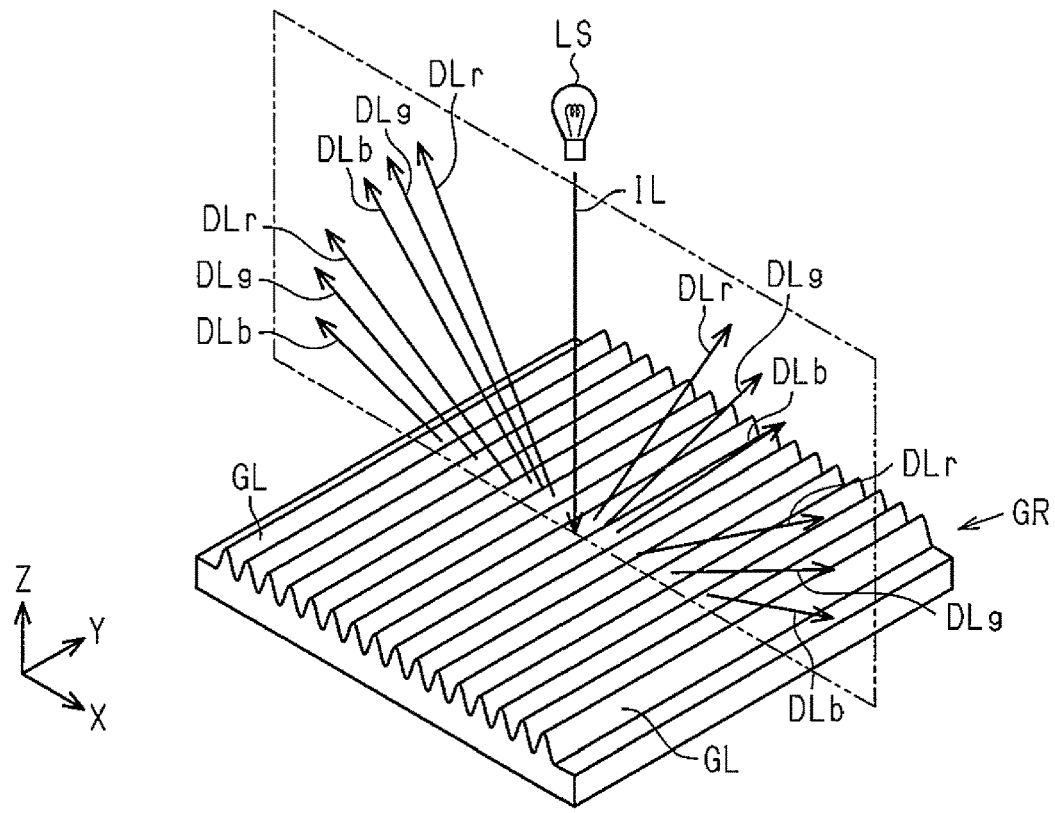
FIG. 13 is a diagram for illustrating the operation of a diffraction grating.

Referring to FIGS. 11 to 13, optical characteristics of the display 10 is now described. FIGS. 11 and 12 show an example of structure of a display portion in the display 10 in which first reflection surfaces 21a are arranged on imaginary lines Lv that are inclined with respect to the X direction.

In FIGS. 11 and 12, for the purpose of illustration, the reflection layer 21 of the display portion is shown as a structure formed by a plurality of protrusions, each having a first reflection surface 21a as the top surface, and a layer including the second reflection surface 21b as one surface on which the protrusions are located.

As shown in FIG. 11, the reflection layer 21 of the display portion includes a reflection surface 21s that in contact with the covered surface 23s of a substrate 11. The reflection surface 21s includes the first reflection surfaces 21a and the second reflection surface 21b. The first reflection surfaces 21a are substantially square in shape and arranged on the corresponding one of the imaginary lines Lv of the display portion. The imaginary lines Lv are parallel to one another and extended in a direction that intersects the X direction. The imaginary lines Lv are arranged random in the direction perpendicular to the extending direction of the imaginary lines Lv.

As shown in FIG. 12, when white illumination light IL emitted by a light source LS enter on the reflection surface 21s, relief structure which is formed by the first reflection surfaces 21a and the second reflection surface 21b in the reflection surface 21s emits diffracted light. Since more than one of the first reflection surfaces 21a are arranged along each of the imaginary lines Lv, the reflection surface 21s emits diffracted light in the direction perpendicular to the extending direction of the imaginary lines Lv. When the direction that is perpendicular to the X direction and the Y direction and is parallel to the thickness direction of the substrate 11 is the Z direction, and the direction in which the imaginary lines Lv are arranged is the arrangement direction, the reflection surface 21s emits diffracted light in a plane extending in the arrangement direction and the Z direction.

The imaginary lines Lv are arranged at random intervals, and a plurality of first reflection surfaces 21a arranged along one imaginary line Lv and the second reflection surface 21b that is located between adjacent ones of the first reflection surfaces 21a on the imaginary line Lv are considered as forming one pseudo surface. The first reflection surfaces 21a may be considered as a structure in which multiple pseudo surfaces are arranged in different intervals, that is a structure having different grating constants d. In such a structure, relief structures of different grating constants d overlap with one another in one display portion. Accordingly, the reflection surface 21s does not emit diffracted light at different emission angles according to the wavelengths of the diffracted light. Instead, diffracted light of each wavelength are emitted at multiple angles so that diffracted light beams of different wavelengths are superimposed.

Although the illumination light IL enter on a point in display portion in FIG. 12, the light source LS actually emits the illumination light IL toward an area. The illumination light IL enter on certain area, rather than a point, in display portion. Thus, the light perceived by the observer at a fixed point is mixed of multiple lights of different wavelengths had a certain range wavelength. As a result, the observer perceives light having a color produced by multiple light beams of different wavelengths.

As shown in Equation (2), the light intensity, i.e., the diffraction efficiency η, of a diffracted light beam emitted from diffraction grating varies depending on wavelength of the diffracted light. Assuming that the width of grating lines of diffraction grating, that is, width L of grooves and grating constant d are uniform, the depth r of grooves in diffraction grating and wavelength λ of illumination light determine the diffraction efficiency η.

Thus, in display portion, the diffraction efficiency η of a diffracted light beam of each wavelength depends on the inter-reflection-surface distance D1 between the first reflection surfaces 21a and the second reflection surface 21b of the display portion and wavelength λ of illumination light. The light that reaches eyes of the observer is the colored light in which the intensity of the light of a certain wavelength has been lowered in the white illumination light incident on the reflection surface 21s.

For example, when the inter-reflection-surface distance D1 of a display is set to a specific value, the diffraction efficiency of blue light having a wavelength of 460 nm is reduced, so that the diffracted light that reaches the eyes of the observer mainly consists of red light of a wavelength of 630 nm and green light of a wavelength of 540 nm. Accordingly, the observer perceives yellow light.

In contrast, with a display portion in which the inter-reflection-surface distance D1 is set to a value that differs from the value of the example described above, the diffraction efficiency of red light, for example, is reduced, so that the diffracted light that reaches eyes of the observer mainly consists of green light and blue light. Accordingly, the observer perceives cyan colored light, that is, light blue colored light.

FIG. 12 shows an example of display portion. Of the illumination light IL from the light source LS, which emits white light, the display portion dimming the intensity of red diffracted light DLr and emits green diffracted light DLg and blue diffracted light DLb are higher than that of the red diffracted light DLr. The light beams of different wavelengths are emitted at various emission angles as compared to the light diffracted by a diffraction grating. Thus, the light emitted from the display portion is less likely to be iridescent and change its color as the viewing point changes. As a result, light having a color that is produced by light beams of certain wavelengths is perceived.

The displayed color, which is the color of light emitted by the display portion, is not perceived by the observer who is in a position where the diffracted light emitted by the display portion does not reach. Thus, unlike a printed article formed by dyes or pigments, the display portion provides two states, a state in which the observer perceives the displayed color and a state in which the observer does not perceive the displayed color, depending on the position of light source or the observer.

That is, the conditions for observing the display portion includes conditions under which light emitted by display portion can be perceived, and conditions under which light emitted by display portion cannot be perceived.

The conditions under which light can be perceived may include an indoor situation in which light from the light source LS, such as a fluorescent lamp, enter on the reflection surface 21s of the display 10 in the direction substantially perpendicular to the reflection surface 21s and the observer can visually perceive the light emitted from the display portion of the display 10. Further, the conditions under which the light can be perceived may include an outdoor situation in which light, such as sunlight, enter on the reflection surface 21s in the direction substantially perpendicular to the reflection surface 21s and the observer can visually perceive light emitted by display portion.

The condition under which the light cannot be perceived may include a situation in which the light from the light source LS enter on the reflection surface 21s from the substantially horizontal direction, so that the display portion hardly emits light. Further, the conditions under which the light cannot be perceived may include a situation in which the observer looks at the display 10 from a direction that differs from the direction perpendicular to the extending direction of the imaginary lines Lv of the display 10 and, even though the reflection surface 21s emits diffracted light, the observer looks at the display 10 at such an angle that the diffracted light does not reach the observer.

In the display portion of the display 10, a plurality of first reflection surfaces 21a is arranged along each imaginary line Lv. This gives the directivity to the emission direction of the light emitted by the display portion. Thus, unlike a structure in which the display portions emit light isotropically, the display 10 emits colored light, and the image displayed by the display 10 changes dynamically.

FIG. 13 shows a diffraction grating GR having a plurality of grating lines GL extending in the Y direction. The grating lines GL are arranged regularly in the X direction. This diffraction grating GR emits diffracted light as follows. When the illumination light IL emitted by the light source LS enter on the diffraction grating GR, the diffraction grating GR emits red diffracted light DLr, green diffracted light DLg, and blue diffracted light DLb in the XZ plane at mutually different emission angles in the X direction. The X direction is perpendicular to the Y direction, in which the grating lines GL extend.

When light enter on each of the display 10 and the diffraction grating GR, diffracted light is emitted in predetermined directions as emission light. In addition, regular reflection light, or specular reflection light, is emitted in the direction of regular reflection relative to the incident direction of incident light. Regular reflection light is emitted by the display 10 and the diffraction gratings GR regardless of the shapes of the minute structures of the display 10 and the diffraction gratings GR. When the observer looks at the display 10 having the reflection layer 21, the observer typically finds regular reflection light too bright due to high intensity of regular reflection light. The observer thus looks at the display 10 such that regular reflection light does not reach eyes. As such, for purpose of illustration, regular reflection light is not shown in FIGS. 11 to 13.

[Structure of Article]

Figure 14:
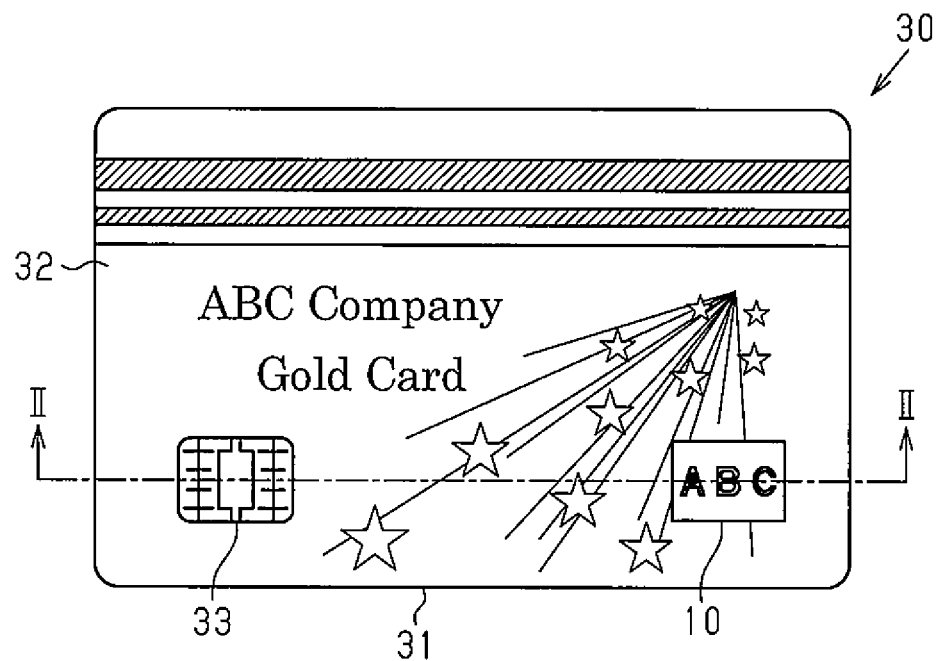
FIG. 14 is a plan view showing the planar structure of an IC card of one embodiment in which the article of the present disclosure is embodied as an IC card.
Figure 15:
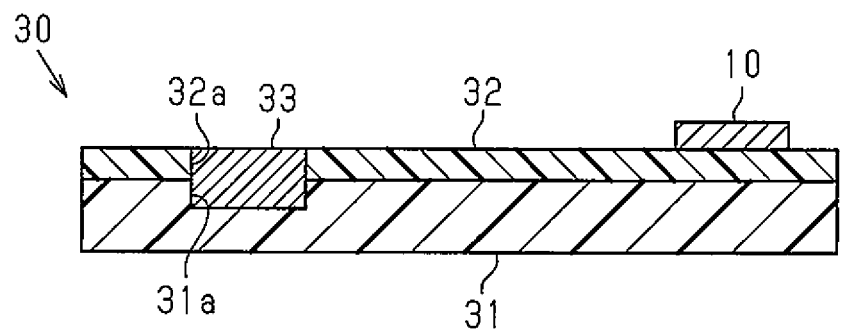
FIG. 15 is a cross-sectional view taken along line II-II in FIG. 14, showing the cross-sectional structure of the IC card.

Referring to FIGS. 14 and 15, structure of an IC card that is an example of an article including the display 10 is now described. The display portions of the display 10 described above are capable of displaying an image having a specific color that cannot be displayed by printing using inks or the like, or by structures other than the reflection surface 21s described above. The image displayed by the display 10 is therefore difficult to reproduce with high accuracy, increasing difficulty of counterfeiting the display 10. Accordingly, any article that includes the display 10 is difficult to counterfeit, so the display 10 may be used to limit counterfeiting of articles.

As shown in FIG. 14, an integrated circuit (IC) card 30 includes a planar card substrate 31, which may be a plastic card substrate 31, a print layer 32 on which an image is printed, an IC chip 33, and a display 10.

As shown in FIG. 15, the print layer 32 is formed on the card substrate 31. The display 10 described above is fixed to the display surface, which is the surface of the print layer 32 that is opposite to the surface in contact with the card substrate 31. The display 10 is fixed using an adhesive layer, for example. The display 10 may be prepared as transfer foil or a sticker having an adhesive layer and affixed to the print layer 32, which is an example of the support portion.

The print layer 32 may have information including at least one of a character, a number, a symbol, and the like and a picture having aesthetic appearance. In addition to the upper side of the card substrate 31, the print layer 32 may be formed on the obverse surface of the display 10, which is opposite to the surface in contact with the print layer 32.

Alternatively, the display 10 may be affixed to the card substrate 31. In this case, the print layer 32 may be formed on the section of the card substrate 31 that is not covered by the display 10 and the obverse surface of the display 10, which is opposite to the surface in contact with the card substrate 31. In this structure, the card substrate 31 is an example of the support portion.

The print layer 32 is made of inks, which may include pigments or dyes, or toner. The inks and toner that may be used for the print layer 32 do not provide the optical effects of the display portions of the display 10. That is, the color and the brightness of the printed article formed by inks or toner remain substantially the same regardless of any change in the observation conditions of the printed article. In other words, the image displayed by the printed article remains substantially same even when observation conditions of the printed article are changed.

When the IC card 30 including the display 10 is observed under different observation conditions, image displayed by the print layer 32 remains substantially same regardless of the observation conditions, while the image displayed by the display 10 vary under different observation conditions. Accordingly, when the IC card 30 is observed under different observation conditions, comparison between the print layer 32 and the display 10 clarifies the difference between the optical effect of the display 10 and that of the print layer 32. This allows for accurate authentication of the IC card 30 using the display 10.

Specifically, brightness of the color of the image displayed by the print layer 32 is preferably equivalent to the brightness of the image displayed by the display 10 under certain observation conditions. Such a structure facilitates visual perception of the difference between a change in the brightness of the image displayed by the display 10 and a change in the brightness of image displayed by the print layer 32 when the IC card 30 is observed under different observation conditions. The print layer 32 and the display 10 thus formed increases effects of preventing counterfeiting.

The print layer 32 may be made of a functional ink that changes the visual effect of the print layer 32 when the observation conditions of the print layer 32 are changed. The functional ink may change image displayed by the print layer 32 when observation conditions of the print layer 32 are changed. The functional ink may be a phosphorescent ink, liquid crystal, or an ink that is invisible when illuminated with visible light and becomes visible when illuminated with ultraviolet rays or infrared rays. When ink that is visible when illuminated with ultraviolet rays or infrared rays is used, the information formed by the ink is hidden from the observer when the ink is illuminated with visible light. When the information is illuminated with ultraviolet rays or infrared rays, the information is reproduced for the observer.

In addition to providing visual effect that changes when observation conditions of the print layer 32 are changed, the print layer 32 formed by functional ink provides a visual effect that differs from that of display portion. Thus, combining the display 10 and the print layer 32 formed by functional ink further increases anti-counterfeiting effect.

Further, the print layer 32 may be a layer whose color changes when energy, such as a laser beam, an ultraviolet ray, heat, or pressure, is applied.

The surface of the card substrate 31 that is in contact with the print layer 32 has a depression 31a, which extends toward the surface that is opposite to the surface in contact with the print layer 32. The print layer 32 includes a through hole 32a in the position aligned with the depression 31a as viewed in the thickness direction of the IC card 30. The IC chip 33 is fitted into the depression 31a and the through hole 32a. The IC chip 33 has an obverse surface, which is surrounded by the print layer 32 and includes a plurality of electrodes. Information is written into and read from the IC chip 33 through electrodes.

The IC card 30 is difficult to counterfeit since the IC card 30 has the display 10 that is difficult to counterfeit. Moreover, the IC card 30 has the IC chip 33 and the print layer 32 in addition to the display 10. The electronic data of the IC chip 33 and the visual effects of the display 10 and the print layer 32 facilitate prevention of counterfeiting.

[Method for Producing Display]

A method for producing the display 10 is now described. To produce the display 10, a light transmissive plastic sheet or film is prepared as the support layer 22. The support layer 22 may be made of polyethylene terephthalate (PET) or polycarbonate (PC), for example. Light transmissive synthetic resin, such as thermoplastic resin, thermosetting resin, or light curing resin, is applied to one surface of the support layer 22 to form a coating. The formed coating is kept in close contact with a metal stamper while the resin is cured. When the coating is made of a thermosetting resin, heat is applied to the coating to cure the resin. When the coating is made of a light curing resin, light is applied to the coating to cure the resin.

The metal stamper is removed from the cured coating so that an relief layer 23 having a covered surface 23s is formed. The support layer 22 is in close contact with the relief layer 23. Thus, when the support layer 22 and the relief layer 23 are made of the same material, there is no boundary between the support layer 22 and the relief layer 23. As such, the support layer 22 and the relief layer 23 may be considered as a substrate 11 that is formed by a single layer.

Then, a reflection layer 21 is formed on the covered surface 23s of the substrate 11 so as to conform to shape of the covered surface 23s. The reflection layer 21 may be formed by vapor-phase deposition, such as vacuum deposition or sputtering.

In the reflection layer 21, the following situations reduce effect of light canceling each other by interference. The situations include a situation in which the sections of the reflection layer 21 located on the first covered surfaces 23a and the section located on the second covered surface 23b have low flatness, and a situation in which the thickness of the sections located on the first covered surfaces 23a and the thickness of the section located on the second covered surface 23b are not uniform.

Such situations lower diffraction efficiency for a wider range of light wavelengths, reducing the difference between the distribution of wavelengths in the light emitted by the display 10 and the distribution of wavelengths in the white incident light. This lowers the chroma of the color of the light emitted by the display 10, causing the color of the emitted light to resemble white.

Thus, the reflection layer 21 is preferably formed such that the first reflection surfaces 21a are substantially parallel to the second reflection surface 21b, conforming to the flatness of the first covered surfaces 23a and the second covered surface 23b.

The reflection layer 21 may be either of a metal layer and a dielectric layer. When the reflection layer 21 is a metal layer, the reflection layer 21 may be made of aluminum, silver, gold, or an alloy of these metals. When the reflection layer 21 is a dielectric layer, the reflection layer 21 may be made of zinc sulfide (ZnS) or titanium oxide ($TiO_2$).

Further, when the reflection layer 21 is a dielectric layer, the reflection layer 21 may be of a single-layer structure or a multilayer structure. Adjacent ones of the layers forming the multilayer structure may have different refractive indices.

Thickness of the reflection layer 21 is preferably between 30 nm and 150 nm inclusive, more preferably between 30 nm and 70 nm inclusive, and yet more preferably 50 nm. The reflection layer 21 may be formed as a thin film by vapor-phase deposition. However, when the reflection layer 21 is made of one of the metals described above, granular structures tend to form on the obverse surface of the reflection layer 21. Greater thickness of the reflection layer 21, larger granular structures become. For this reason, the reflection layer 21 preferably has a small thickness to increase flatness of the reflection layer 21. However, if thickness of the reflection layer 21 is too small, the reflection layer 21 fails to sufficiently reflect light.

Through a thorough study of the relationship between the thickness of the reflection layer 21 and the function of the reflection layer 21, the inventor of the present application has discovered that the thickness of the reflection layer 21 is preferably between 30 nm and 150 nm inclusive in order for the reflection layer 21 to have a desirable flatness and to fully function to reflect light.

As described above, the reflection layer 21 may cover the entire covered surface 23s of the substrate 11, or may cover a part of the covered surface 23s. That is, the reflection layer 21 may partially cover the covered surface 23s. When the reflection layer 21 partially covers the covered surface 23s, the reflection layer 21 may form an image, such as a picture, a character, or a symbol, using the section of the covered surface 23s on which the reflection layer 21 is formed and the section of that on which the reflection layer 21 is not formed.

The reflection layer 21 that partially covers the covered surface 23s may be formed by first forming the reflection layer 21 over the entire covered surface 23s by vapor-phase deposition and then dissolving part of the reflection layer 21 using an agent. Alternatively, the reflection layer 21 that partially covers the covered surface 23s may be formed by first forming the reflection layer 21 over the entire covered surface 23s and then peeling a part of the reflection layer 21 from the relief layer 23 using an adhesive material having a higher adhesiveness to the reflection layer 21 than the relief layer 23. The reflection layer 21 that partially covers the covered surface 23s may also be formed by vapor-phase deposition using a mask, or a lift-off method.

The display 10 may include other functional layers, such as a protection layer for protecting the obverse surface of the display 10 or an antibacterial coating layer that covers the obverse surface of the display 10 to inhibit growth of bacteria on the obverse surface of the display 10.

[Method for Producing Original Plate]

Figure 16:
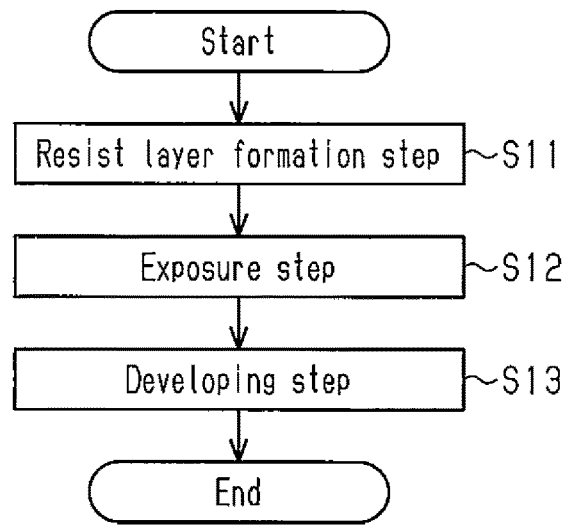
FIG. 16 is a flowchart for illustrating the sequence in the method for producing an original plate.
Figure 17:
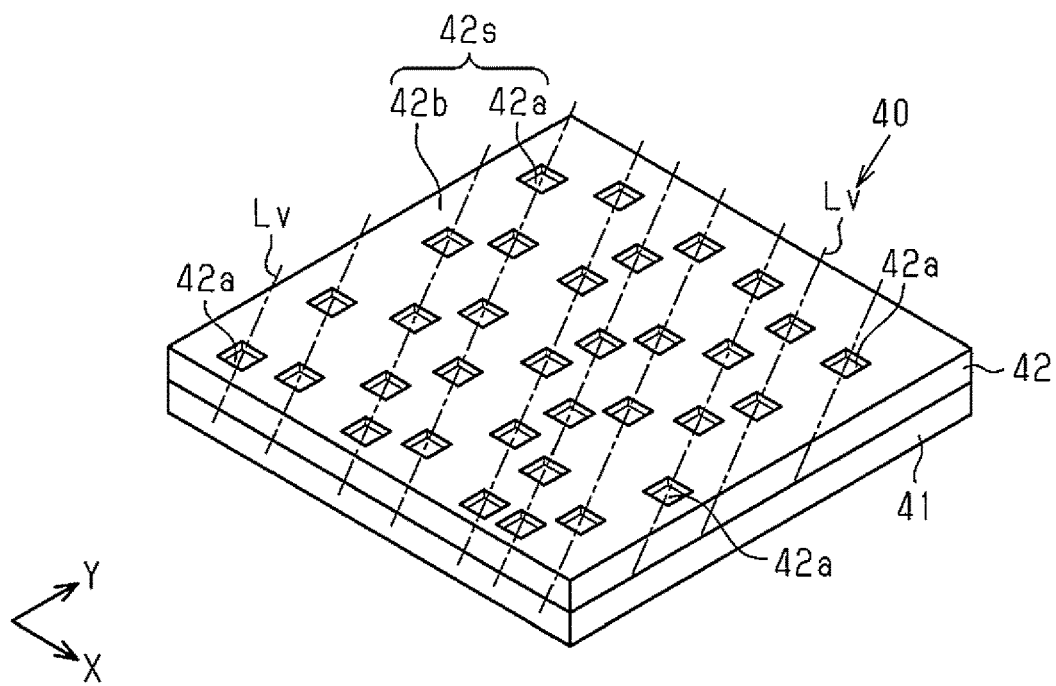
FIG. 17 is a perspective view showing the structure of an original plate.

Referring to FIGS. 16 and 17, a method for producing an original plate for producing a display 10 is now described. The original plate is used to produce a display 10 that includes a covered surface 23s, which includes first covered surfaces 23a and a second covered surface 23b, and a reflection layer 21, which covers the covered surface 23s. Original plate is used as the die for the metal stamper described above.

As shown in FIG. 16, the method for producing an original plate includes a step of forming a resist layer on a surface of a substrate (Step S11), a step of exposing the resist layer to light (Step S12), and a step of developing the exposed resist layer to form a transfer surface in the resist layer (Step S13). That is, the method for producing the original plate includes a resist layer formation step, an exposure step, and a developing step.

The resist layer formation step may include preparing a planar glass substrate and applying a resist on a surface of the glass substrate to form a resist layer. The resist may be an electron-beam resist or a photoresist. The resist is a positive resist, and the exposed portion of the resist is more soluble to developer than the unexposed portion. In the developing step, the exposed portion of the resist is removed from the unexposed portion.

The exposure step includes exposing the resist layer as follows. The exposure step exposes the resist layer to light such that the transfer surface after developing includes a plurality of first transfer surfaces for forming first covered surfaces 23a and a second transfer surface for forming a second covered surface 23b. In addition, the exposure step exposes the resist layer such that the first transfer surfaces are substantially square in shape and the second transfer surface occupies gaps between adjacent ones of the first transfer surfaces in a plan view facing the transfer surface.

Furthermore, the exposure step exposes the resist layer such that the distance between the first transfer surfaces and the second transfer surface in the thickness direction of the glass substrate is set to an extent that the reflection surface 21s of the reflection layer 21 emit colored light by the interference between the light reflected from the sections of the reflection surface 21s of the reflection layer 21 that are located on the first covered surfaces 23a and the light reflected from the section located on the second covered surface 23b.

In addition, in a plan view facing the transfer surface, the exposure step exposes the resist layer such that more than one of the first transfer surfaces are located on each of imaginary lines and, on a straight line intersecting more than one of the imaginary lines, the distances between adjacent ones of the imaginary lines have different extents.

Specifically, exposure step apply to divide the sections of the original plate that correspond to the first reflection surfaces 21a of the display 10 and the section that corresponds to the second reflection surface 21b. When the resist layer is made of an electron-beam resist, the exposure of the resist layer is performed by irradiating the resist layer with electron beams. When the resist layer is made of a photoresist, the exposure of the resist layer is performed by irradiating the resist layer with laser beams of ultraviolet wavelengths.

In exposure step, glass substrate is placed on an XY stage, which can move two-dimensionally in the X direction, which is one direction, and the Y direction perpendicular to the X direction. The resist layer is patterning by exposed with electron beams or laser beams irradiation and moving of the XY stage using a controller that controls the movement of the XY stage.

When the resist is an electron-beam resist, variable-shaped beam exposure method, or rectangular beam exposure method, is preferably used to irradiate the electron-beam resist with electron beams. In the variable-shaped beam exposure method, the electron beam from an electron gun passes through shaping apertures, which are rectangular openings as viewed in the irradiation direction of electron beam, so that the shape of the electron beam in a cross-section perpendicular to the irradiation direction of the electron beam changes to a rectangular shape before the electron beam strikes the obverse surface of the resist layer.

In the spot beam exposure method, the electron beam strikes the resist layer without passing through shaping apertures, and the flexibility of exposure pattern is greater than that of the variable-shaped beam exposure method. However, the spot beam exposure method provides a smaller irradiation area in one exposure and therefore takes more time for pattering than the variable-shaped beam exposure method. The variable-shaped beam exposure method provides a larger irradiation area in one exposure than the spot beam exposure method. In addition, because of the irradiation area of each exposure is variable, required the patterning time can be short.

In the variable-shaped beam exposure method, the section of the resist layer corresponding to each first covered surface 23a of the display portion is preferably pattered in one exposure. This allows the entire of one first covered surface 23a is exposed under the same conditions, increasing flatness of the first covered surface 23a as compared to when the section of one first covered surface 23a is written in multiple exposures.

In addition, when each section corresponding to one first covered surface 23a is written in one exposure, the sections corresponding to first covered surfaces 23a are exposed under substantially same conditions. Consequently, the sections corresponding to the first covered surfaces 23a are substantially equal to one another in the distance in which the energy for dissolving the resist is obtained from the electron beam. This distance is measured in the thickness direction of the resist layer.

In the step of exposing the resist layer, electron beams or laser beams not only strike the irradiation section of the resist layer, which is irradiated with electron beams or laser beams, but also scatters to an area near the irradiation section. Accordingly, the energy of electron beams or laser beams is applied to the irradiation section and also to the area near the irradiation section. Thus, the patterning of the resist layer may not satisfy the requirements set to the irradiation apparatus of electron beams or laser beams.

In this respect, when the display portions in one display region are substantially equal to one another in the occupancy ratio of the first covered surfaces 23a, the sections of the resist layer corresponding to the display portions receive substantially the same amount of electron beams or laser beams. Thus, the scattering of electron beams or laser beams affects the display portions substantially equally. Consequently, even if the scattering of electron beams or laser beams affects the resist layer, the color of light emitted by the display portions is less likely to be relief or shifted.

Further, in exposure process of the resist layer using electron beams, the larger the area irradiated with electron beams, the greater the distance in which the energy for dissolving the resist is obtained from the electron beam in the thickness direction of the resist layer, even when the amounts of energy provided by the electron beams are the same. Thus, in order to reduce variant in the distances between the first covered surfaces 23a and the second covered surface 23b in the display portions, all the first covered surfaces 23a in the display portions are preferably substantially equal in the length of one side of the first reflection surface 21a in a plan view facing the reflection surface 21s.

In a structure in which a first reflection surface 21a of the display 10 is in contact with another first reflection surface 21a, an irradiated region and another irradiated region that is in contact with the first irradiated region are irradiated with electron beams in the exposure process of the resist layer. Consequently, the electron beam that strikes one of the two irradiated region scatters to the other, and the amount of energy given by electron beams becomes excessive at the boundary between the two irradiated regions. This lowers the accuracy of the shape at the boundary between the two irradiated regions after the developing process.

For this reason, in the display 10, each first covered surface 23a in each display portion is preferably separated from the other first covered surfaces 23a. In addition, in a plurality of display portions, the first covered surfaces 23a in a display portion are preferably separated by gaps from the first covered surfaces 23a of the other display portions adjacent to the display portion.

In the developing step, the resist layer irradiated with electron beams or laser beams is developed. This process removes the section of the resist layer irradiated with electron beams or laser beams from the section that is not irradiated with electron beams or laser beams, forming the transfer surface, which is an relief surface, in the obverse surface of the resist layer.

That is, as shown in FIG. 17, an original plate 40 includes a glass substrate 41 and a resist layer 42. The resist layer 42 includes a transfer surface 42s, which is opposite to the surface that is in contact with the glass substrate 41. The transfer surface 42s includes a plurality of first transfer surfaces 42a for forming first covered surfaces 23a and a second transfer surface 42b for forming a second covered surface 23b. The positions of the first transfer surfaces 42a differ from the position of the second transfer surface 42b in the thickness direction of the transfer surface 42s. The second transfer surface 42b occupies gaps between adjacent ones of the first transfer surfaces 42a as viewed facing the transfer surface 42s.

The first transfer surfaces 42a of the transfer surface 42s are transferred to form the first covered surfaces 23a of the covered surface 23s of the display 10, and the second transfer surface 42b is transferred to form the second covered surface 23b of the covered surface 23s.

In the original plate 40, the distance between the first transfer surfaces 42a and the second transfer surface 42b is equal to the inter-covered-surface distance D2. That is, the distance between the first transfer surfaces 42a and the second transfer surface 42b is set to an extent that the interference between the light reflected from the first reflection surfaces 21a located on the first covered surfaces 23a of the display 10 and the light reflected from the second reflection surface 21b located on the second covered surface 23b for emit color light.

In a plan view facing the transfer surface 42s of the resist layer 42, the first transfer surfaces 42a are substantially square in shape, and a plurality of first transfer surfaces 42a is arranged on each of the imaginary lines Lv. On a straight line intersecting imaginary lines Lv, the distances between adjacent ones of the imaginary lines Lv have different extents.

The original plate 40 produced as described above is subjected to electroforming and plating to form a metal stamper having the relief surface to which the transfer surface 42s of the original plate 40 has been transferred.

The advantages of the display, the article, the original plate, and the method for producing an original plate described above are now described.

(1) The display 10 emits light having a color determined by the inter-reflection-surface distance D1. Since a plurality of first reflection surfaces 21a is arranged on each imaginary line Lv, the first reflection surfaces 21a on each imaginary line Lv may be considered as forming one pseudo surface 21d. The interference between the reflection light from the first reflection surfaces 21a arranged on the imaginary lines Lv and the reflection light from the second reflection surface 21b located between the imaginary lines Lv produces colored light. The colored light has directivity and is emitted in the direction substantially perpendicular to the imaginary lines Lv as viewed in the thickness direction of the substrate 11. Consequently, the display 10 emits colored light and displays an image that changes dynamically as compared to a structure that emits light isotropically.

(2) On each imaginary line Lv, first reflection surfaces 21a are not arranged with a fixed periodicity, reducing the likelihood that the structure including the first reflection surfaces 21a emits diffracted light in the extending direction of the imaginary lines Lv.

(3) The irradiation sections irradiated with light in the exposure step, which are the sections of the original plate 40 corresponding to the first reflection surfaces 21*a*, are substantially equal in size. Therefore, each irradiation section receives substantially the same amount of energy from the light, limiting reduction in the accuracy of the shape of the original plate 40, which would otherwise occur if the amount of energy applied to the irradiation sections is not uniform. This limits reduction in the accuracy of the shape of the display 10.

(4) In the exposure step, an irradiation section of the original plate 40 corresponding to one of the first reflection surfaces 21*a* is not in contact with the other irradiation sections corresponding to other first reflection surfaces 21*a*. This avoids a situation in which an excessive amount of energy is given to the boundary between two irradiation sections. As a result, the accuracy of shape of the original plate 40 and thus the accuracy of shape of the display 10 are unlikely to be lowered.

(5) When the display portions are substantially equal to one another in area occupied by the first reflection surfaces 21*a*, the display portions emit light of substantially same intensity.

(6) When the occupancy ratio of the first reflection surfaces 21*a* in each display portion is between 15% and 50% inclusive, the intensity of light emitted by the display portion is high enough to be perceived.

[Modifications]

The above-described embodiment may be modified as follows.

The article is not limited to an IC card and may be other cards, such as a magnetic card, a wireless card, and an identification (ID) card. Alternatively, the article may be securities, such as banknotes or gift certificates, or a luxury product, such as an art object. Further, the article may be a tag to be attached to a product that should be authenticated, or may be a package enclosing a product that should be authenticated, or a part of the package.

In addition to the display portion described above, the reflection surface 21*s* of the reflection layer 21 of the display may include a portion of different functionality, which is a region having an optical effect that differs from that of the display portion. The portion of different functionality includes at least one of a diffraction portion that diffracts the light incident on the reflection surface 21*s*, an anti-reflection portion that prevents reflection of the light incident on the reflection surface 21*s*, and a light scattering portion that scatters the light incident on the reflection surface 21*s*.

The diffraction portion may be the diffraction grating that is described above with reference to FIG. 13 and diffracts the light incident on the reflection surface 21*s* to emit light of iridescent colors that change depending on the conditions under which the observer looks at the display.

Figure 18:
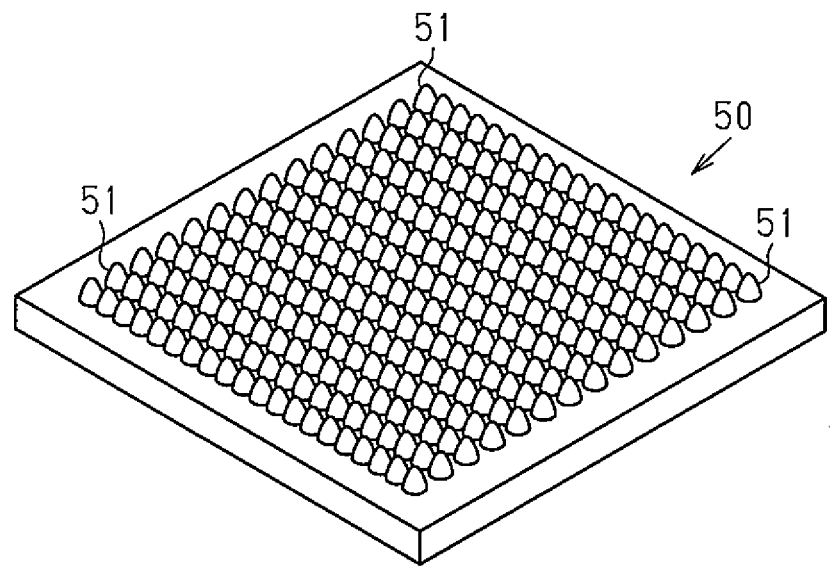
FIG. 18 is a perspective view showing the structure of an example of an anti-reflection portion of a display of a modification.

As shown in FIG. 18, an anti-reflection portion 50 includes a plurality of minute protrusions 51 arranged at a pitch that is shorter than or equal to visible wavelengths. The protrusions 51 limit reflection of the light incident on the protrusions 51. The anti-reflection portion 50 displays a black color accordingly.

Figure 19:
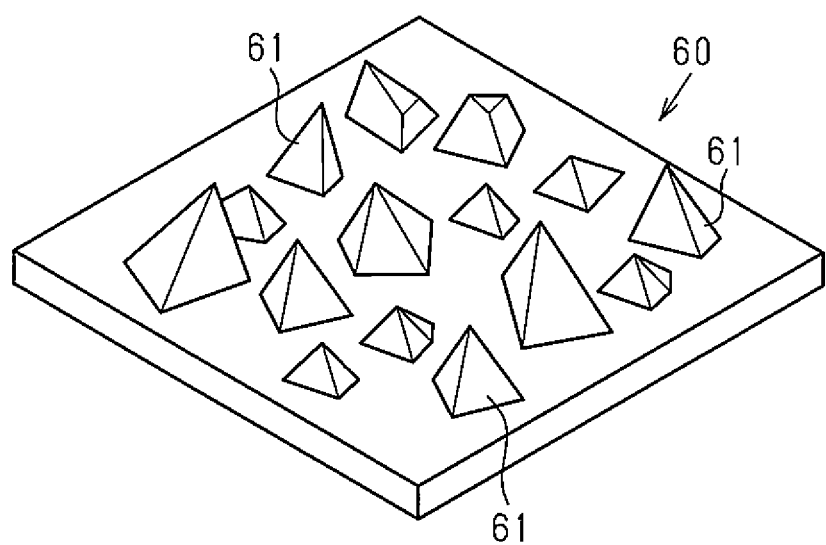
FIG. 19 is a perspective view showing the structure of an example of a light scattering portion of a display of a modification.

As shown in FIG. 19, a light scattering portion 60 includes a plurality of protrusions 61 that differ from one another in at least one of the size as viewed facing the reflection surface 21*s* of the display and the dimension in the thickness direction of the display. The dimension of each protrusion 61 in the thickness direction of the display is a few μm or greater, for example. The light scattering portion 60 diffusely reflects the light incident on the light scattering portion 60 and emits white light.

This configuration has the following advantages.

(7) The reflection surface 21*s* includes at least one of the diffraction portion, the anti-reflection portion 50, and the light scattering portion 60. Accordingly, the display has an additional optical effect that differs from the optical effect of emitting colored light. The display thus provides complex optical effects as compared to a structure in which the reflection surface 21*s* includes only the display portion. This increases the difficulties in counterfeiting the display.

In each of the first display region 12, the second display region 13, and the third display region 14, the display portions do not have to be identical to each other in the extending direction of the imaginary lines Lv. The structure described above with reference to FIG. 7 has the first display region 12, the second display region 13, and the third display region 14, which differ from one another in the extending direction of the imaginary lines Lv. In addition, each display region may include display portions that differ from one another in the extending direction of the imaginary lines Lv.

Specifically, in each of the display portions included in each display region, the imaginary lines Lv are parallel to each other within the display portion. In addition, for two display portions adjacent to each other, the angle between imaginary lines, which is the angle formed by the extending direction of the imaginary lines Lv in one of the display portions and the extending direction of the imaginary lines Lv in the other display portion, is preferably less than or equal to 10°. One of the display portions is an example of the third display portion, and the other display portion is an example of the fourth display portion.

This configuration has the following advantages.

(8) The angle between imaginary lines for two display portions adjacent to each other is less than or equal to 10°. Therefore, the brightness of the two adjacent display portions change successively as the angle formed by the extending direction of the imaginary lines and the viewing direction of the observer changes.

In each display portion, occupancy ratio of the first reflection surfaces 21*a* may be less than 15%. Such a structure still has an advantage equivalent to advantage (1) since the display portion emits light having a color determined by the inter-reflection-surface distance D1 to some extent.

In a plurality of display portions, it is sufficient that at least two display portions have the same occupancy ratio of the first reflection surfaces 21*a*. Such a structure still provides an advantage equivalent to advantage (5) by the display portions that have same occupancy ratio of the first reflection surfaces 21*a*.

Each display portion may have a different occupancy ratio of the first reflection surfaces 21*a*. Such a structure still has an advantage equivalent to advantage (1) since the reflection surface 21*s* emits light having a color determined by the inter-reflection-surface distance D1.

In a plurality of display portions, it is sufficient that at least two display portions adjacent to each other are formed such that there are gaps between the first reflection surfaces 21*a* of one of the display portions and the first reflection surfaces 21*a* of the other. Such a structure still provides an advantage equivalent to advantage (4) by the display portions that have gaps between the first reflection surfaces 21*a*.

Two display portions adjacent to each other may be formed so as not to have gaps between first reflection surfaces 21*a* of one of the display portions and first reflection surfaces 21*a* of the other. Such a structure still provides an advantage equivalent to advantage (4) in each display portion, since each of the first reflection surfaces 21*a* in each display portion is separated from the other first reflection surfaces 21a in the display portion as viewed facing the first reflection surfaces 21a.

The lengths of sides of the first reflection surfaces 21a may have different extents. Such a structure still has an advantage equivalent to advantage (1) since the reflection surface 21s emits light having a color determined by the inter-reflection-surface distance D1.

Figure 20:
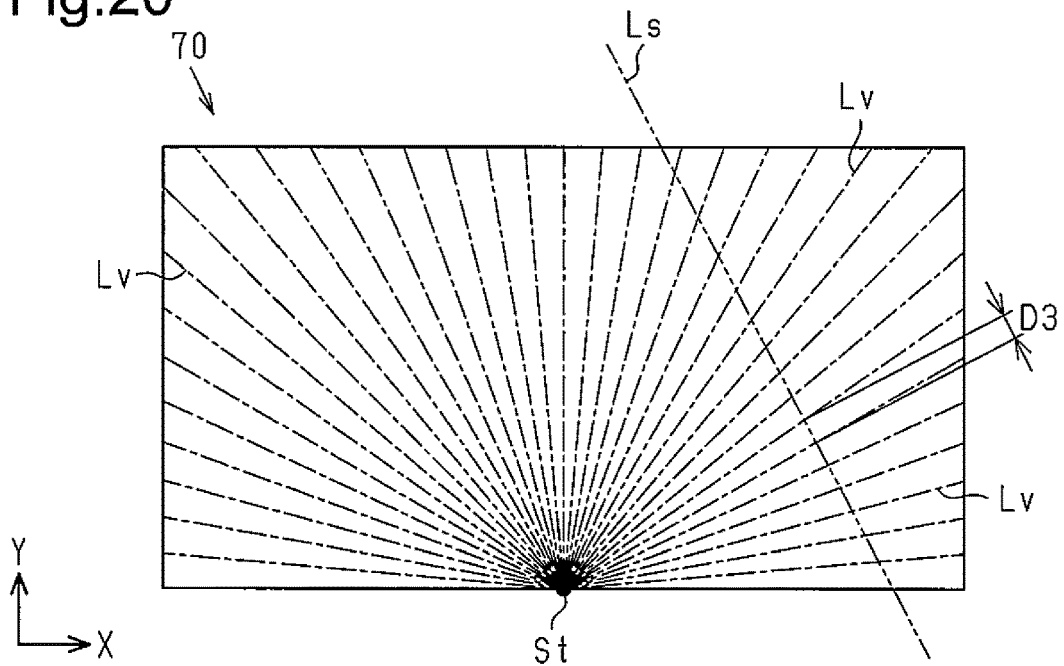
FIG. 20 is a plan view for illustrating the state of the imaginary lines in a display of a modification.

As shown in FIG. 20, in a display 70, a plurality of imaginary lines Lv may extend radially from a starting portion St in the reflection surface 21s of the display 70. FIG. 20 shows the planar structure as viewed facing the reflection surface 21s of the display 70. For the purpose of illustration, FIG. 20 does not show the first reflection surfaces 21a arranged on the imaginary lines Lv.

As shown in FIG. 20, the display 70 has a rectangular shape extending in the X direction. The starting portion St is located on one of two sides of outer edge of the display 70 that extend in the X direction. The starting portion St includes the center in the X direction of the side. The display 70 includes a plurality of imaginary lines Lv, which extends radially from one starting portion St in the reflection surface 21s in shape of a circular sector. The imaginary lines Lv extend from same starting point. On a straight line Ls intersecting imaginary lines Lv, the inter-imaginary-line distances D3 have different extents. The angle formed by two adjacent ones of the imaginary lines Lv is set to be less than or equal to 10°, for example, and is preferably a few degrees.

In the reflection surface 21s, the distance between the first reflection surfaces 21a arranged along each imaginary line Lv and the second reflection surface 21b is substantially uniform over the entire display 70. Thus, the display 70 emits light having a fixed color that is the same over the entire display 70.

Referring to FIGS. 21 to 26, the operation of the display 70 is now described. In FIGS. 21 to 26, the viewing direction, which is the viewing direction of the observer of the display 70, extends in the Y direction as viewed facing the display 70. FIGS. 21 to 26 show the images perceived by the observer while the display 70 is rotated gradually from the initial state, in which the side in outer edges of the display 70 that includes the starting portion St extends in the X direction. The display 70 is rotated counterclockwise as viewed in FIGS. 21 to 26 about the rotation axis, which passes through the starting portion St and extends perpendicularly to the drawing sheet. In FIGS. 21 to 26, the region of the display 70 that is perceived by the observer as having a high brightness is shown in white, and the region that is perceived by the observer as having a low brightness is shaded with dots.

Figure 21:
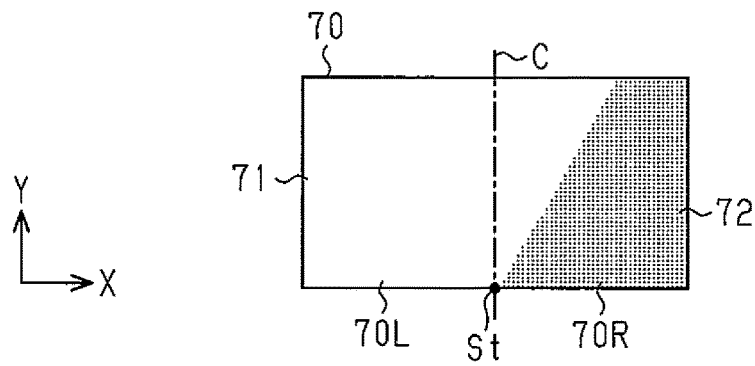
FIG. 21 is a diagram for illustrating the operation of the display of the modification.

Referring to FIG. 21, the section of the display 70 that is on the left side of the center line C, which passes through the starting portion St and extends in the Y direction, is a left section 70L, and the section on the right side of the center line C is a right section 70R. In the initial state, the entire left section 70L and part of the right section 70R form a high-brightness region 71 having a high brightness in the display 70, and the part of the right section 70R that is not included in the high-brightness region 71 forms a low-brightness region 72.

Figure 22:
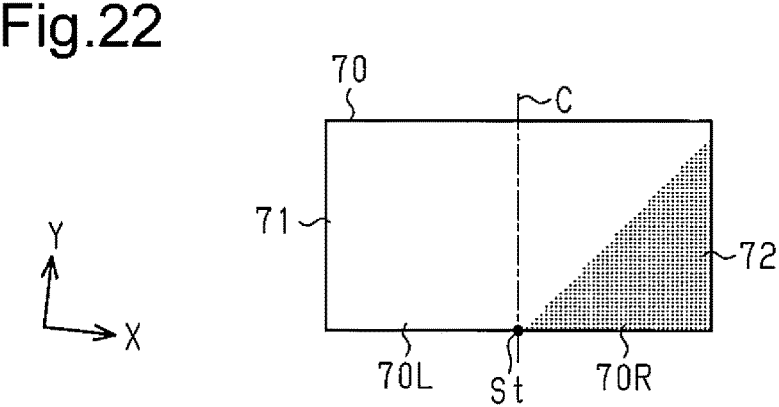
FIG. 22 is a diagram for illustrating the operation of the display of the modification.

As shown in FIG. 22, when the display 70 rotates counterclockwise about rotation axis, the entire left section 70L of the display 70 is the high-brightness region 71 as with the initial state, while the part of the right section 70R that is included in the high-brightness region 71 expands as compared to the initial state.

Figure 23:
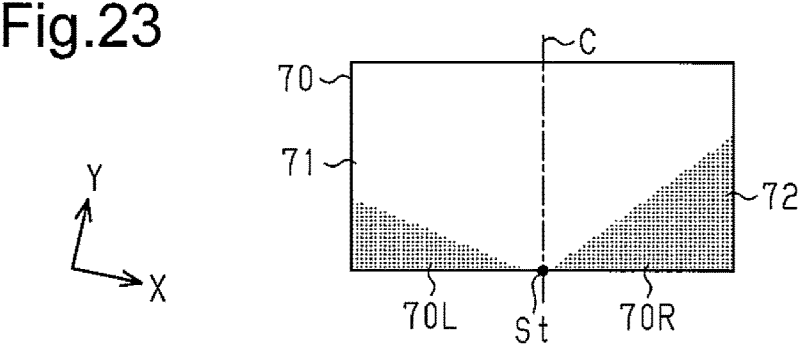
FIG. 23 is a diagram for illustrating the operation of the display of the modification.
Figure 24:
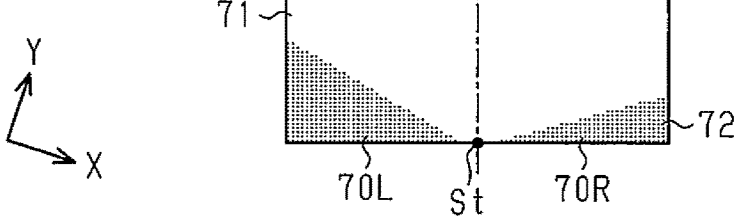
FIG. 24 is a diagram for illustrating the operation of the display of the modification.

As shown in FIGS. 23 and 24, as the display 70 further rotates counterclockwise increasing the rotation angle, the part of the left section 70L that is included in the low-brightness region 72 expands, while the part of the right section 70R that is included in the low-brightness region 72 becomes narrower. In other words, the part of the left section 70L that is included in the high-brightness region 71 becomes narrower, and the part of the right section 70R that is included in the high-brightness region 71 expands.

Figure 25:
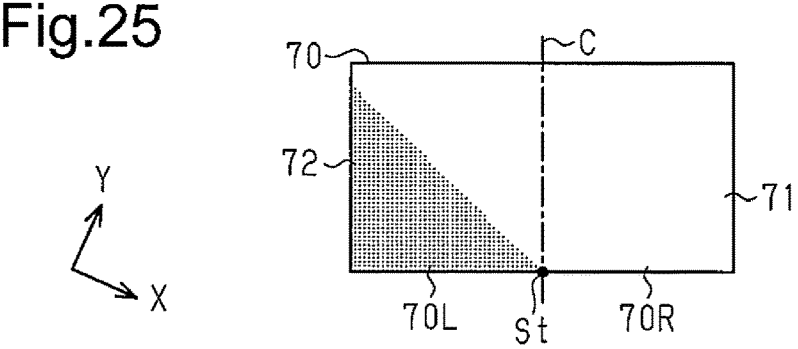
FIG. 25 is a diagram for illustrating the operation of the display of the modification.
Figure 26:
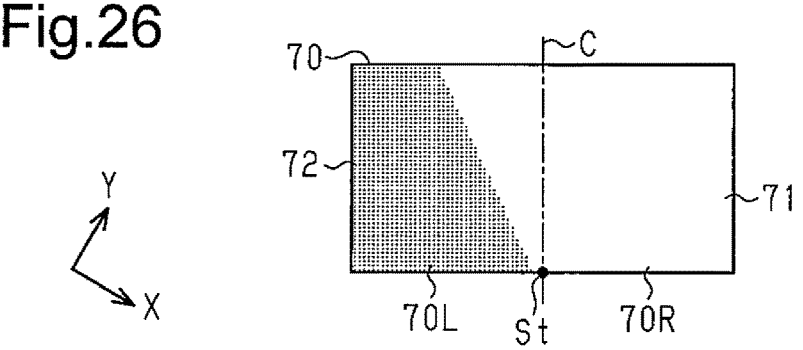
FIG. 26 is a diagram for illustrating the operation of the display of the modification.

As shown in FIGS. 25 and 26, as the display 70 further rotates counterclockwise increasing the rotation angle, the part of the left section 70L that is included in the low-brightness region 72 expands, while the entire right section 70R remains as the high-brightness region 71.

The display 70 described above has the following advantage.

(9) As the angle formed by the extending direction of the imaginary lines Lv and the viewing direction of the observer changes, the part of the display 70 that is perceived as the high-brightness region 71, which has a relatively high brightness, and the part that is perceived as the low-brightness region 72, which has a relatively low brightness, change continuously.

In a structure in which a plurality of imaginary lines Lv extends radially from one starting portion St, the plurality of imaginary lines Lv may form a circular shape in one display.

In a structure in which a plurality of imaginary lines Lv extends radially from the starting portion St, the starting portion St may be a region having a certain area. In this case, the imaginary lines Lv share the starting portion St, but do not have to extend from the same starting point. In such a structure, the plurality of imaginary lines Lv may form a ring shape or an arcuate shape in one display.

In a structure in which one display includes a plurality of display portions, the plurality of display portions may include at least one of the display portions described below, in addition to the display portions that are identical to one another in the extending direction of the imaginary lines Lv. That is, the plurality of display portions may include at least one of a set of two display portions that are adjacent to each other and have an angle between imaginary lines of less than or equal to 10° and a display portion including a plurality of imaginary lines Lv extending radially from one starting portion St.

The lengths of sides of the first reflection surfaces 21a may have different extents. Such a structure still is able the reflection surface 21s to emit light having a color determined by the inter-reflection-surface distance D1, as long as each first reflection surface 21a is substantially identical to the other first reflection surfaces 21a in the inter-reflection-surface distance D1.

The purpose of the display is not limited to preventing counterfeiting. The display may be used to decorate an article. Further, the display may be a display that is observed for its own quality. The display that is observed for its own quality may be used as an item such as a toy or a learning material.

The invention claimed is:

1. A display comprising:
   a substrate including a covered surface; and
   a reflection layer covering at least part of the covered surface, wherein
   the reflection layer has an obverse surface including a plurality of first reflection surfaces and a second reflection surface,
   in a plan view facing the obverse surface of the reflection layer, the first reflection surfaces are substantially square in shape and have substantially the same area, and the second reflection surface occupies gaps between adjacent ones of the first reflection surfaces,
a distance between the first reflection surfaces and the second reflection surface in a thickness direction of the substrate has an extent that the obverse surface of the reflection layer emits colored light by interference between light reflected from the first reflection surfaces and light reflected from the second reflection surface,
in a plan view facing the obverse surface of the reflection layer, more than one of the first reflection surfaces are located on each of a plurality of imaginary lines, wherein each of the first reflection surfaces is located on an imaginary line of the plurality of imaginary lines in a configuration such that a center of each of the more than one first reflection surfaces is located on a respective one of the respective plurality of imaginary lines and no single reflection surface of the more than one of the first reflection surfaces is located on more than one imaginary line of the plurality of imaginary lines,
on a straight line intersecting more than one of the imaginary lines, for distances between adjacent ones of the imaginary lines, one of the distances is different from the other distances,
the obverse surface emits diffracted light in the plane that extends in the thickness direction of the substrate and a direction perpendicular to a direction in which the imaginary lines extend,
the obverse surface of the reflection layer includes a plurality of first display portions and a plurality of second display portions,
each of the first display portions and each of the second display portions have substantially the same shape and substantially the same area,
the first display portions include a first plurality of first reflection surfaces among the plurality of first reflection surfaces,
the second display portions include a second plurality of first reflection surfaces among the plurality of first reflection surfaces,
the imaginary lines on which the first plurality of first reflection surfaces is positioned are parallel to each other and extend in a first direction, and
the imaginary lines on which the second plurality of first reflection surfaces is positioned are parallel to each other and extend in a second direction different from the first direction.

2. The display according to claim 1, wherein, on each of the imaginary lines, distances between adjacent ones of the first reflection surfaces vary irregularly with respect to an order of arrangement of the first reflection surfaces.

3. The display according to claim 1, wherein, in a plan view facing the obverse surface of the reflection layer, a length of one side of each first reflection surface is substantially equal to a length of one side of other first reflection surfaces.

4. The display according to claim 1, wherein
at boundaries between the first display portions and the second display portions adjacent to the first display portions, there are gaps between the first reflection surfaces in the first display portions and the first reflection surfaces in the second display portions.

5. The display according to claim 4, wherein, in a plan view facing the obverse surface of the reflection layer, the sum of the areas of the first reflection surfaces included in each of the first display portions is substantially equal to the sum of the areas of the first reflection surfaces included in each of the second display portions.

6. The display according to claim 4, wherein the sum of the areas of the first reflection surfaces included in each of the first display portions is between 15% and 50% inclusive of a total area of the first display portion.

7. The display according to claim 1, wherein the obverse surface of the reflection layer includes at least one of a diffraction portion that diffracts light incident on the obverse surface of the reflection layer, an anti-reflection portion that limits reflection of light incident on the obverse surface of the reflection layer, or a light scattering portion that scatters light incident on the obverse surface of the reflection layer.

8. An article comprising:
a display; and
a support portion that supports the display,
wherein the display is the display according to claim 1.

9. An original plate for producing a display including a covered surface, which includes first covered surfaces and a second covered surface, and a reflection layer, which covers the covered surface and has an obverse surface including a plurality of first display portions and a plurality of second display portions, the original plate comprising:
a substrate including a surface; and
a resist layer that is located on the surface of the substrate and includes a transfer surface, which is opposite to a surface that is in contact with the substrate, wherein
the transfer surface includes a plurality of first transfer surfaces for forming the first covered surfaces and a second transfer surface for forming the second covered surface,
in a plan view facing the transfer surface, the first transfer surfaces are substantially square in shape and have substantially the same area, and the second transfer surface occupies gaps between adjacent ones of the first transfer surfaces,
a distance between the first transfer surfaces and the second transfer surface in a thickness direction of the substrate is set to an extent that an obverse surface of the reflection layer emits colored light by interference between light reflected from sections of the obverse surface of the reflection layer that are located on the first covered surfaces and light reflected from a section of the obverse surface of the reflection layer that is located on the second covered surface,
in a plan view facing the transfer surface, more than one of the first transfer surfaces are located on each of a plurality of imaginary lines, wherein each of the more than one of the first transfer surfaces is located on an imaginary line of the plurality of imaginary lines in a configuration such that a center of each of the more than one first transfer surfaces is located on a respective one of the respective plurality of imaginary lines and no single transfer surface of the more than one of the first transfer surfaces is located on more than one imaginary line of the plurality of imaginary lines,
on a straight line intersecting more than one of the imaginary lines, for distances between adjacent ones of the imaginary lines, one of the distances is different from the other distances,
the obverse surface emits diffracted light in the plane that extends in the thickness direction of the substrate and a direction perpendicular to a direction in which the imaginary lines extend,
the transfer surface includes a plurality of first portions corresponding to the plurality of first display portions of the display and a plurality of second portions corresponding to the plurality of second display portions of the display, each of the first portions and each of the second portions have substantially the same shape and substantially the same area, the first portions include a first plurality of first transfer surfaces among the plurality of first transfer surfaces, the second portions include a second plurality of first transfer surfaces among the plurality of first transfer surfaces, the imaginary lines on which the first plurality of first transfer surfaces is positioned are parallel to each other and extend in a first direction, and the imaginary lines on which the second plurality of first transfer surfaces is positioned are parallel to each other and extend in a second direction different from the first direction.

10. A method for producing an original plate for producing a display including a covered surface, which includes first covered surfaces and a second covered surface, and a reflection layer, which covers the covered surface and has an obverse surface including a plurality of first display portions and a plurality of second display portions, the method comprising:

forming a resist layer on a surface of a substrate;

exposing the resist layer to light; and developing the exposed resist layer to form a transfer surface in the resist layer, wherein the exposing includes exposing the resist layer such that:
the transfer surface after developing includes a plurality of first transfer surfaces for forming the first covered surfaces and a second transfer surface for forming the second covered surface, in a plan view facing the transfer surface, the first transfer surfaces are substantially square in shape and have substantially the same area, and the second transfer surface occupies gaps between adjacent ones of the first transfer surfaces;

a distance between the first transfer surfaces and the second transfer surface in a thickness direction of the substrate is set to an extent that the obverse surface of the reflection layer emits colored light by interference between light reflected from sections of the obverse surface of the reflection layer that are located on the first covered surfaces and light reflected from a section of the obverse surface of the reflection layer that is located on the second covered surface; and in a plan view facing the transfer surface, more than one of the first transfer surfaces are located on each of a plurality of imaginary lines, on a straight line intersecting more than one of the imaginary lines, for distances between adjacent ones of the imaginary lines, one of the distances is different from the other distances, wherein each of the more than one of the first transfer surfaces is located on an imaginary line of the plurality of imaginary lines in a configuration such that a center of each of the more than one first transfer surfaces is located on a respective one of the respective plurality of imaginary lines and no single transfer surface of the more than one of the first transfer surfaces is located on more than one imaginary line of the plurality of imaginary lines, the obverse surface emits diffracted light in the plane that extends in the thickness direction of the substrate and a direction perpendicular to a direction in which the imaginary lines extend, the transfer surface includes a plurality of first portions corresponding to the plurality of first display portions of the display and a plurality of second portions corresponding to the plurality of second display portions of the display, each of the first portions and each of the second portions have substantially the same shape and substantially the same area, the first portions include a first plurality of first transfer surfaces among the plurality of first transfer surfaces, the second portions include a second plurality of first transfer surfaces among the plurality of first transfer surfaces, the imaginary lines on which the first plurality of first transfer surfaces is positioned are parallel to each other and extend in a first direction, and the imaginary lines on which the second plurality of first transfer surfaces is positioned are parallel to each other and extend in a second direction different from the first direction.

* * * * *